US011889249B2

(12) United States Patent
Liang et al.

(10) Patent No.: US 11,889,249 B2
(45) Date of Patent: Jan. 30, 2024

(54) INTERNAL VENTING MECHANISMS FOR AUDIO SYSTEM WITH NON-POROUS MEMBRANE

(71) Applicant: Apple Inc., Cupertino, CA (US)

(72) Inventors: Jiahui Liang, San Francisco, CA (US); Andrew L. Doyle, Cupertino, CA (US); Nikolas T. Vitt, Redwood City, CA (US); Yingyi Wang, Suzhou (CN); David W. Robison, San Jose, CA (US)

(73) Assignee: APPLE INC., Cupertino, CA (US)

( * ) Notice: Subject to any disclaimer, the term of this patent is extended or adjusted under 35 U.S.C. 154(b) by 112 days.

(21) Appl. No.: 17/445,931

(22) Filed: Aug. 25, 2021

(65) Prior Publication Data

US 2022/0095024 A1 Mar. 24, 2022

Related U.S. Application Data

(60) Provisional application No. 63/179,934, filed on Apr. 26, 2021, provisional application No. 63/083,045, filed on Sep. 24, 2020.

(51) Int. Cl.

| | |
|---|---|
| ***H04R 1/02*** | (2006.01) |
| ***H04R 1/44*** | (2006.01) |
| ***H04R 9/06*** | (2006.01) |

(52) U.S. Cl.

CPC ............... *H04R 1/023* (2013.01); *H04R 1/44* (2013.01); *H04R 1/028* (2013.01); *H04R 9/06* (2013.01); *H04R 2201/023* (2013.01); *H04R 2400/11* (2013.01); *H04R 2499/11* (2013.01)

(58) Field of Classification Search

CPC .......... H04R 1/023; H04R 1/44; H04R 1/028; H04R 9/06; H04R 2201/023; H04R 2400/11; H04R 2499/11; H04R 1/086; H04R 1/2826; H04R 1/02; H04R 1/08; H04M 1/18; H05K 5/02; H05K 5/0213; H05K 5/061

See application file for complete search history.

(56) References Cited

U.S. PATENT DOCUMENTS

| | | | | |
|---|---|---|---|---|
| 10,021,800 B1 * | 7/2018 | Zhang | H05K 5/0213 | |
| 10,911,847 B2 * | 2/2021 | Kenaley | H04R 1/02 | |
| 2009/0290741 A1 * | 11/2009 | Daley | H04R 1/086 | 381/359 |
| 2015/0163572 A1 * | 6/2015 | Weiss | H04R 1/2876 | 381/337 |
| 2016/0091378 A1 * | 3/2016 | Tsai | G01L 9/125 | 73/728 |

(Continued)

*Primary Examiner* — Oyesola C Ojo

(74) *Attorney, Agent, or Firm* — DORSEY & WHITNEY LLP

(57) ABSTRACT

An electronic device can include a housing, an audio component, and a gasket. The housing can define a first internal volume and the audio component can define a second internal volume. The audio component can include membrane and a venting element having a fluid impermeable layer. The venting element can define a fluid path placing the first internal volume and the second internal volume in fluid communication. At least a portion of the fluid path can extend parallel to the fluid impermeable layer. The gasket can define a seal between the first internal volume and an ambient environment adjacent the housing.

19 Claims, 12 Drawing Sheets

(56) References Cited

U.S. PATENT DOCUMENTS

| | | | | |
|---|---|---|---|---|
| 2016/0176704 | A1* | 6/2016 | Cargill | H04R 19/04 257/419 |
| 2017/0132954 | A1* | 5/2017 | Birk | G09F 3/10 |
| 2017/0164084 | A1* | 6/2017 | Vitt | H04R 1/08 |
| 2018/0063634 | A1* | 3/2018 | Dave | H04R 1/023 |
| 2020/0329289 | A1* | 10/2020 | Kenaley | H04R 1/02 |
| 2021/0389200 | A1* | 12/2021 | Rogers | G01L 9/0072 |

* cited by examiner

INTERNAL VENTING MECHANISMS FOR AUDIO SYSTEM WITH NON-POROUS MEMBRANE

CROSS-REFERENCE TO RELATED APPLICATION(S)

This claims priority to U.S. Provisional Patent Application No. 63/179,934, filed 26 Apr. 2021, and entitled "INTERNAL VENTING MECHANISMS FOR AUDIO SYSTEM WITH NON-POROUS MEMBRANE," and to U.S. Provisional Patent Application No. 63/083,045, filed 24 Sep. 2020, and entitled "INTERNAL VENTING MECHANISMS FOR AUDIO SYSTEM WITH NON-POROUS MEMBRANE," the entire disclosures of which are hereby incorporated by reference.

FIELD

The described examples relate generally to electronic devices. More particularly, the present examples relate to venting electronic devices.

BACKGROUND

Recent advances in electronics have driven electronic devices to encompass smaller form factors while providing increased battery life, performance, and durability. These attributes have contributed to electronic devices, such as smartwatches, which are portable and used in a variety of activities, such as, swimming, travel, exercise, scuba-diving, mountain climbing, backpacking, snorkeling, camping, fishing, biking, and other activities. Indeed, portable electronic devices provide instantaneous resources related to indoor and outdoor activities, such as, monitoring or measuring heartrate, location information, atmospheric pressure, and the like. While portable electronic devices are desirable in a broad range of activities, attributes of the environment in which the portable electronic device is used like temperature, humidity, and pressure can significantly impact the performance and functionality of electronic components within the portable electronic device. Thus, improvements and advances to portable electronic devices can be desirable to withstand environmental attributes without inhibiting the functionality of the electronic device.

SUMMARY

According to some aspects of the present disclosure, an electronic device can include a housing at least partially defining a first internal volume, and an audio component defining a second internal volume. The audio component can include a membrane and a venting element. The venting element can define a fluid path extending from the first internal volume to the second internal volume and place the first internal volume in fluid communication with the second internal volume.

In some examples, the audio component includes a microphone. The electronic device can be a smartwatch or a smartphone in some examples. The venting element can include a fluid impermeable layer and at least a portion of the fluid path can extend parallel to the fluid impermeable layer. The fluid impermeable layer can define a channel extending from a central portion of the venting element to a periphery of the venting element. The channel can form at least a portion of the fluid path. The venting element can include a porous material disposed adjacent the fluid impermeable layer. The porous material can define the fluid path. The porous material can include metal. The venting element can include a coil coupled to the fluid impermeable layer in some examples. The coil can at least partially define the fluid path.

In some examples, the venting element can include a first layer at least partially defining a first channel extending into the first layer from a central portion of the venting element. The venting element can include a second layer at least partially defining a second channel extending into the second layer from a periphery of the venting element. The venting element can include a fluid permeable intermediate layer disposed between the first layer and the second layer. The fluid permeable intermediate layer can place the first and second channels in fluid communication.

According to some examples, an audio component can include a case at least partially defining an internal volume, a membrane at least partially defining the internal volume, and a venting element in fluid communication with the internal volume. The venting element can define a fluid path extending the internal volume an ambient environment external to the case.

In some examples, the fluid path can extend from a central portion of the venting element to a periphery of the venting element. In some examples, the venting element can include a first layer at least partially defining a first channel extending into the first layer from a central portion of the venting element. The venting element can include a second layer at least partially defining a second channel extending into the second layer from a periphery of the venting element. The venting element can include a fluid permeable intermediate layer disposed between the first layer and the second layer. The fluid permeable intermediate layer can place the first and second channels in fluid communication. The first and second channels can extend parallel to the fluid permeable intermediate layer. A width of the first channel can vary along a length of the first channel. A width of the second channel can vary along a length of the second channel. A region of the fluid permeable intermediate layer disposed between the first and second channels can place the first and second channels in fluid communication.

The venting element can include a series of protrusions disposed along a length of the fluid path. In some examples, the venting element can include a first fluid impermeable layer, a second fluid impermeable layer, and a porous layer disposed between the first fluid impermeable layer and the second fluid impermeable layer. The porous layer can define the fluid path. The porous layer can include a metal foam. In some examples, the venting element can include a coiled member coupled to the fluid impermeable layer. At least a portion of the fluid path can be formed by the fluid impermeable layer and the coiled member. In some examples, the venting element can include a coiled member coupled to the fluid impermeable layer. The coiled member can define a conduit extending through the coiled member and at least a portion of the fluid path can be formed by the conduit. The audio component can be a speaker or a microphone.

According to some aspects of the present disclosure, a venting element for a portable electronic device can include a fluid impermeable layer defining a surface of the venting element. The venting element can include a fluid permeable layer disposed adjacent the fluid impermeable layer. The fluid permeable layer can define a fluid path extending from a central portion of the venting element to a periphery of the venting element.

In some examples, the fluid permeable layer can define a channel extending from a central portion of the venting element toward a periphery of the venting element. The channel can form at least a portion of the fluid path. The fluid permeable layer can include a foam in some examples. The fluid permeable layer can include a coiled tubular member in some examples.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
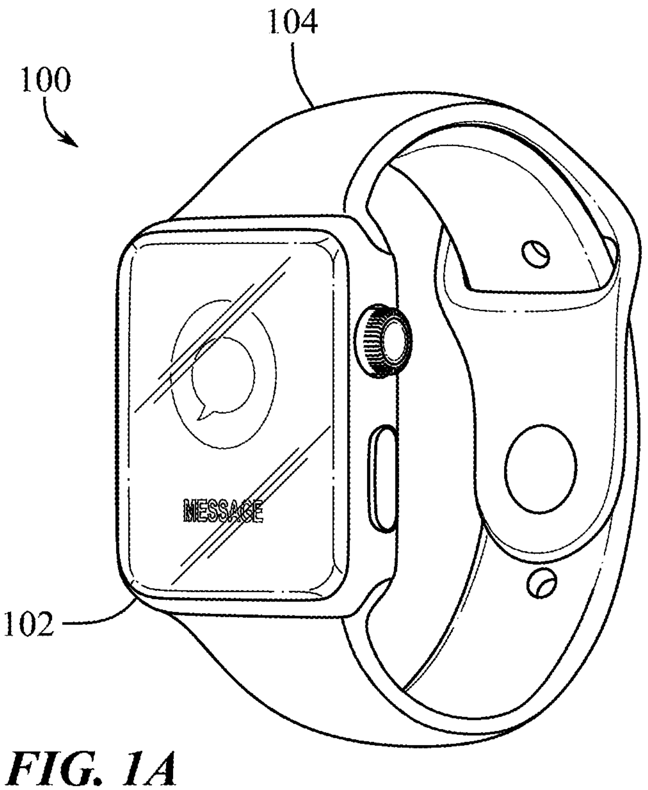
FIG. 1A shows a perspective view of a portable electronic device.

The present description provides examples, and is not limiting of the scope, applicability, or configuration set forth in the claims. Thus, it will be understood that changes can be made in the function and arrangement of elements discussed, without departing from the spirit and scope of the disclosure, and various examples can omit, substitute, or add other procedures or components, as appropriate. Also, features described with respect to some examples can be combined in other examples.

Portable electronic devices can utilize electronic components having one or more membranes, such as, audio components like speakers or microphones, barometric vents, etc. For example, a microphone can include a membrane which moves relative to acoustic waves exerted on the membrane. Electronic and/or electrical components within the microphone can convert the movement of the membrane into electrical signals which can be communicated to other components of the portable electronic device. The membrane and microphone housing can define a volume which experiences a variance in relative pressure (e.g., a pressure within the volume relative to a pressure of an ambient environment outside of the volume). For example, temperature and/or atmospheric pressure resultant of submersion within a liquid can vary the relative pressure within the volume. Fluctuations in relative pressure can degrade operation of the membrane or otherwise cause the microphone to perform poorly. Accordingly, venting the volume defined by the membrane and microphone housing can be beneficial to regulate the relative pressure within the volume. One option for venting the membrane utilizes a porous membrane which can vent fluid through the membrane itself. However, porous membranes can expose the portable electronic device to ingress of contaminants, such as, dust, sand, debris, fluid, corrosive materials, and other types of organic and inorganic materials.

The present disclosure relates to venting elements having features which define a fluid path placing a first internal volume of the portable electronic device in fluid communication with a second internal volume of the portable electronic device. For example, a portable electronic device can include a housing which defines a first internal volume and the portable electronic device can include an audio component, such as, a microphone assembly, speaker assembly, or other audio component which forms a second internal volume. The audio component can include a venting element at least partially disposed within the second internal volume. The venting element can include one or more fluid impermeable layers. The venting element can define a fluid path having portions which extend parallel to the one or more fluid impermeable layers and placing the first internal volume and the second internal volume in fluid communication. Thus, the venting element can provide a vent or fluid path between the audio component and the housing to regulate a relative pressure within the first volume. In some examples the first internal volume can be in fluid communication with the ambient environment outside of the housing by a barometric vent disposed within a sidewall of the housing.

Portable electronic devices are trending toward smaller form factors or are otherwise trending toward electronic components which take up less space within the housing of the portable electronic device. This trend can cause multiple electronic components to be packaged tightly within the housing, disposed within a common internal volume. However, packaging components within a relatively small and confined space can present challenges, for example, the operation of one electronic component can diminish or degrade the efficient operation of another electronic component. A microphone, for example, can be disposed within a housing and can be required to vent through the same portion of the housing that forms the back-volume for a speaker of the portable electronic device. In this example, the fluid path defined by the microphone to vent relative pressure can also enable acoustic waves from the speaker to travel to the microphone (e.g., through the fluid path) and thereby decrease or diminish the functionality of the microphone.

Some aspects of the present disclosure relate to venting elements which define fluid paths while also attenuating or reducing acoustic waves having wavelengths between 20 Hz and 20 kHz. In other words, the fluid path defined by the venting element can act as a low-pass filter which permits airflow through the fluid path while also attenuating acoustic waves above 20 Hz. For example, layers of a venting element can define one or more channels which form at least part of a fluid path. The one or more channels can extend from a central portion of the venting element toward a periphery of the venting element. In some examples, two channels can be placed in fluid communication by a fluid permeable intermediate layer disposed between the two channels. In some examples, the fluid permeable intermediate layer can enable fluid flow between the two channels but prevent or inhibit acoustic waves from entering the second internal volume (e.g., the volume defined by the audio component).

As another example, a venting element can include a porous layer disposed between first and second fluid impermeable layers. The porous layer can include a metal foam. As another example, a venting element can include a coiled member coupled to a fluid impermeable layer and a fluid path can be defined between the coiled member and the fluid impermeable layer. In some examples, the coiled member can form a hollow passage or conduit (e.g., a hollow coiled tube) and at least a portion of the fluid path can be defined by the passage conduit.

While membrane supports and venting elements are described herein as distinct and individual components of the audio component assembly in some examples, those skilled in the art will readily appreciate that the venting element can act as a membrane support in some examples (see FIGS. 3A-3C) and can therefore define a fluid path which places two or more volumes in fluid communication. Any of the following examples depicted in FIGS. 1A-7F can be implemented with a venting element that functions as a membrane support or can be otherwise implemented with a membrane support and a distinct venting element. Thus, any functionality or features described herein relating to venting elements can be equally applicable to membrane supports and vice versa.

In another aspect of the present disclosure, an enclosure or cap can be positioned over at least a portion of the audio component to prevent or inhibit ancillary acoustic waves from negatively impacting the performance of the audio component. For example, while a microphone and a speaker are each in fluid communication with a common volume (e.g., a volume formed by the housing of a portable electronic device), acoustic waves generated by the speaker can propagate into a volume of the microphone and degrade or otherwise interfere with the performance of the microphone. The enclosure or cap can enable fluid communication between the microphone and the volume while simultaneously preventing or inhibiting the acoustic waves generated by the speaker from degrading performance of the audio component.

In examples, the enclosure or cap can be fluid impermeable except at a vent. The vent can enable fluid communication between the microphone and the volume such that a pressure differential between the microphone and an ambient environment can be equalized. The enclosure or cap can be directly coupled to the audio component, the housing of the portable electronic device, or a combination thereof. In some examples, the enclosure or cap can be formed from a material that enables fluid communication but otherwise at least partially attenuates acoustic waves. For example, the enclosure or cap can include a porous material, such as, a metallic or elastomeric open-cell foam. These and other examples are discussed below with reference to FIGS. 8-10.

The detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1A shows an example of a portable electronic device 100. The portable electronic device 100 shown in FIG. 1A is a watch, such as a smartwatch. The smartwatch of FIG. 1A is merely one representative example of a device that can be used in conjunction with the systems and methods disclosed herein. The portable electronic device 100 can correspond to any form of wearable electronic device, a portable media player, a media storage device, a portable digital assistant ("PDA"), a tablet computer, a computer, a mobile communication device, a GPS unit, a remote control device, or other electronic device. The portable electronic device 100 can also be referred to as an electronic device, or a consumer device. In some examples, the portable electronic device 100 can include a housing 102 that can carry operational components, for example, in an internal volume at least partially defined by the housing 102. The electronic device 100 can also include a strap 104, or other retaining component that can secured the device 100 to a body of a user, as desired. Further details of the portable electronic device 100 are provided below with reference to FIG. 1B.

Figure 1B:
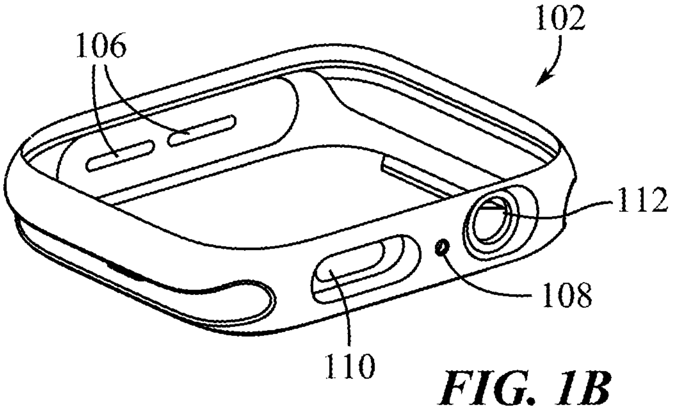
FIG. 1B shows a perspective view of a housing of the portable electronic device of FIG. 1A.

FIG. 1B shows the housing 102 depicted in FIG. 1A. The housing 102 can be a substantially continuous or unitary component, and can define one or more openings 106, 108, 110, 112 to receive components of the portable electronic device 100 and/or to provide access to an internal portion of the electronic device 100. For example, one or more of the openings 106, 108, 110, 112 can provide fluid communication between an ambient environment outside of the housing 102 and one or more internal volumes within the housing 102 and/or electronic components disposed within the housing 102. The electronic components can be disposed within the internal volume defined at least partially by the housing 102, and can be affixed to the housing 102 via adhesives, internal surfaces, attachment features, threaded connectors, studs, posts, or other features, that are formed into, defined by, or otherwise part of the housing 102 and/or a cover and/or back cover of the portable electronic device 100.

Figure 1C:
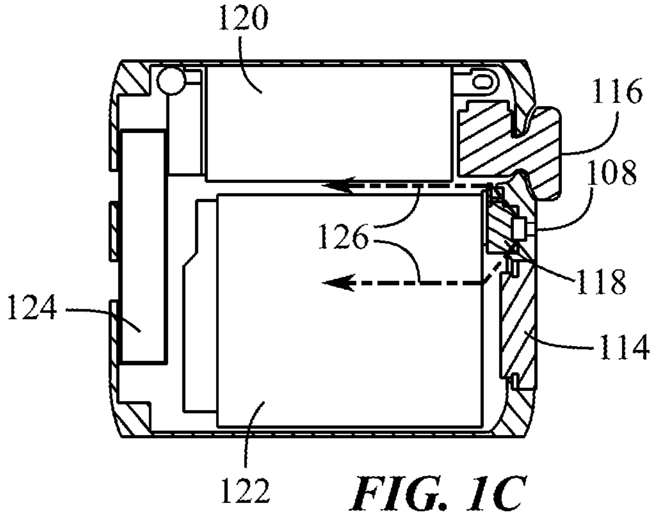
FIG. 1C shows a top cross-sectional view of the portable electronic device of FIG. 1A.

FIG. 1C shows a top cross-sectional view of the portable electronic device 100 depicted in FIG. 1A. In some examples, the device 100 can include input components such as one or more buttons 114 and/or a crown 116 that can be disposed in the openings 110, 112. An audio component assembly 118 can be disposed in the internal volume in communication with the external or ambient environment through the opening 108. In some examples, the audio component assembly 118 can include a microphone or speaker. Other electronic components can be disposed within the internal volume of the housing 102, for example, a haptic feedback module 120, a battery 122, and a speaker 124. While this disclosure only references a few specific electronic components of the portable electronic device 100, it will be appreciated that the portable electronic device can include any number or variety of electronic components can be included in the portable electronic device 100. For example, the portable electronic device 100 can include a display, a main logic board having a system in package (SiP), one or more antennas, wireless communication circuits, a camera, a second logic board, one or more sensors, and/or any other electronic component.

One or more of the electronic components disposed within the portable electronic device 100 can include a membrane (see FIGS. 2-6C) which requires venting to regulate relative pressure within a volume and thereby avoid damaging the membrane (e.g., inelastic deformation caused by the relative pressure on the membrane) and/or enabling satisfactory operation of the electronic component. For example, the audio component assembly 118 can include a membrane which at least partially defines a volume within the audio component assembly 118. This volume can require venting to regulate relative pressure within the volume and prevent damage to the membrane and enable efficient functionality of the audio component assembly 118. In some examples, a venting element, such as, a membrane support or other component can define a fluid path between the volume of the audio component assembly 118 and the internal volume of the housing 102 (as illustrated by arrows 126 in FIG. 1C). Thus, in some examples, the audio component assembly 118 can include a venting element which defines a fluid path (illustrated by arrows 126) to the internal volume of the housing 102 and the various components disposed within the internal volume of the housing 102.

Figure 1D:
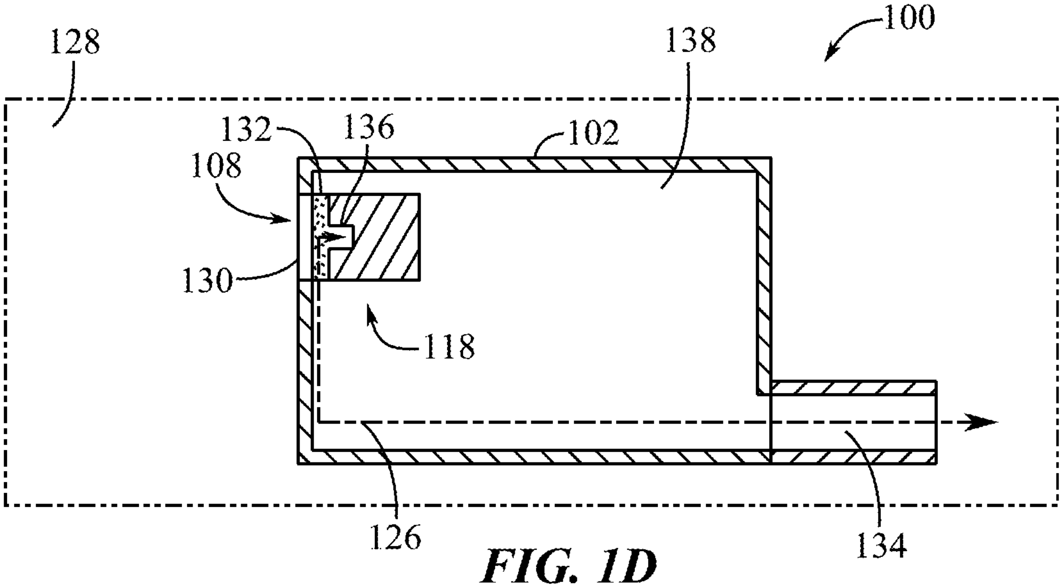
FIG. 1D shows a block diagram of a portable electronic device.

FIG. 1D shows a block diagram of the portable electronic device 100 disposed in an ambient environment 128. The block diagram of the portable electronic device 100 includes the housing 102, the audio component assembly 118 having a membrane 130 and a venting element 132, and a housing vent 134. The membrane 130 can be non-porous or fluid impermeable and can include polytetrafluoroethylene (PTFE). The membrane 130 can have a thickness of about 10 microns, between about 3 microns and about 7 microns, between about 7 microns and about 12 microns, or less than about 30 microns. The membrane 130 and the audio component assembly 118 can define or otherwise form an audio component volume 136.

The audio component volume 136 can experience a variance in relative pressure (e.g., a pressure within the audio component volume 136 relative to a pressure of an ambient environment 128 outside of the audio component volume 136). For example, a variance in temperature and/or atmospheric pressure can vary the relative pressure within the audio component volume 136. Fluctuations in relative pressure can degrade the membrane 130 or otherwise cause the audio component assembly 118 to perform poorly. In some examples, the audio component assembly 118 can include a membrane support (not shown). While the membrane support can be disposed adjacent the membrane 130 to limit inelastic deformation of the membrane 130, the membrane support cannot entirely prevent degradation and damage to the membrane 130. Accordingly, venting the audio component volume 136 can be beneficial to regulate the relative pressure within the audio component volume 136 and thereby prevent damage to the membrane 130. In some examples, the venting element 132 can provide a fluid path (illustrated by arrow 126) which places the audio component volume 136 in fluid communication with a volume defined by the housing (e.g., housing volume 138). The housing volume 138 can be in fluid communication with the housing vent 134 to provide pressure regulation between the housing volume 138 and the ambient environment 128. In other words, an absolute pressure within the housing volume 138 can be equalized or substantially equalized to an absolute pressure of the ambient environment 128. Due to the venting element 132 providing fluid communication between the audio component volume 136 and the housing volume 138, an absolute pressure within the audio component volume 136 can also be equalized or substantially equalized to the absolute pressure of the ambient environment 128 through the fluid path (illustrated as arrow 126) which places the audio component volume 136 in fluid communication with the ambient environment 128 (i.e., through the housing volume 138 and the housing vent 134).

Any number or variety of components in any of the configurations described herein can be included in the portable electronic device. The components can include any combination of the features described herein and can be arranged in any of the various configurations described herein. The structure and arrangement of components of a portable electronic device having a housing with structures described herein, and defining an internal volume, as well as the concepts regarding membranes and fluid paths, can apply not only to the specific examples discussed herein, but to any number of examples in any combination. An example of an audio component assembly of a portable electronic device including components having various features in various arrangements are described below, with reference to FIG. 2.

Figure 2:
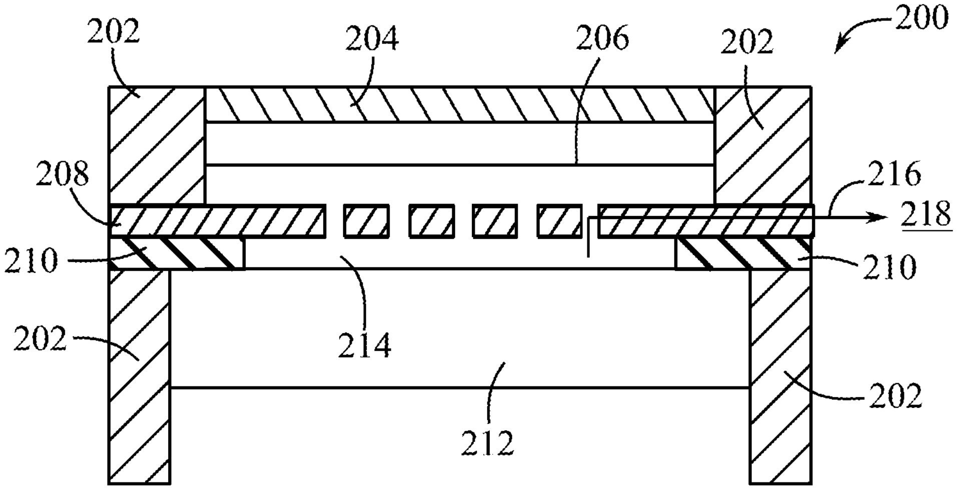
FIG. 2 shows a cross-sectional side view of an audio component assembly.

FIG. 2 shows a cross-sectional view of an audio component assembly 200. The audio component assembly 200 can include a case 202, a grill 204, a membrane 206, a venting element 208, a gasket or seal 210, and electronic components 212. The case 202 can include any desired material, such as polymeric materials or plastics. The case 202 can retain the other components of the audio component assembly 200 which can be affixed thereto. In some examples, the seal 210 can be affixed, bonded, or otherwise secured to the case 202. The seal 210 can include a compliant material, such as a polymeric material like rubber or plastic. In some examples, the seal 210 can include silicone rubber. In some examples, the seal 210 can be overmolded onto the case 202 and can directly contact the case 202 and a housing of the portable electronic device (not shown) to provide a seal or barrier between the ambient environment (e.g., ambient environment 128) and the internal volume of the device (e.g., housing volume 138).

The grill 204 can be secured to the case 202 and can act as a physical barrier to prevent objects, such as dust or rocks, from damaging the audio component assembly 200. The grill 204 can be permeable to air or liquid, and acoustic signals can pass therethrough to the membrane 206. The membrane 206 can move relative to acoustic waves exerted on the membrane 206. The electrical components 212 within the audio component assembly 200 can convert the movement of the membrane 206 into electrical signals which can be communicated to other components of a portable electronic device (e.g., portable electronic device 100). For example, the electrical components 212 can include one or more magnets, coils, wires, plates, capacitors, batteries, resistors, transistors, inductors, a combination thereof, or any other electrical component which can be utilized to manufacture an audio component.

In some examples, the venting element 208 can include one or more fluid impermeable layers. In some examples, the fluid impermeable layer or layers can define a surface of the venting element. The membrane 206 and other elements of the audio component assembly 200 can define an audio component volume 214. In some examples, where the audio component assembly 200 is included in the internal volume of an electronic device, the audio component volume 214 can be referred to as the second internal volume. For example, the membrane 206 and one or more of the case 202, the seal 210, and the electrical components 212 can form or define the audio component volume 214. The venting element 208 can define a fluid path 216 which extends substantially parallel to the one or more fluid impermeable layers, and or one or more surfaces defined by the fluid impermeable layers, and places the audio component volume 214 in fluid communication with an internal volume of the device 238 (e.g., the housing volume 138 shown in FIG. 1D). In some examples, the venting element 208 can be disposed adjacent the membrane 206 and can function as a membrane support element. That is, the venting element 208 can provide a backstop or a stiffener than interfaces with the membrane 206 when the membrane 206 is deformed into the venting element 208. Additionally, or alternatively, the audio component assembly 200 can include a distinct and separate membrane support element disposed adjacent the venting element 208 (see FIGS. 4A-6C).

Any number or variety of components in any of the configurations described herein can be included in the portable electronic device. The components can include any combination of the features described herein and can be arranged in any of the various configurations described herein. The structure and arrangement of components of a portable electronic device having a housing with structures described herein, and defining an internal volume, as well as the concepts regarding membranes and fluid paths, can apply not only to the specific examples discussed herein, but to any number of examples in any combination. Examples of audio component assemblies of a portable electronic device including components having various features in various arrangements are described below, with reference to FIGS. 3A-3C.

Figure 3A:
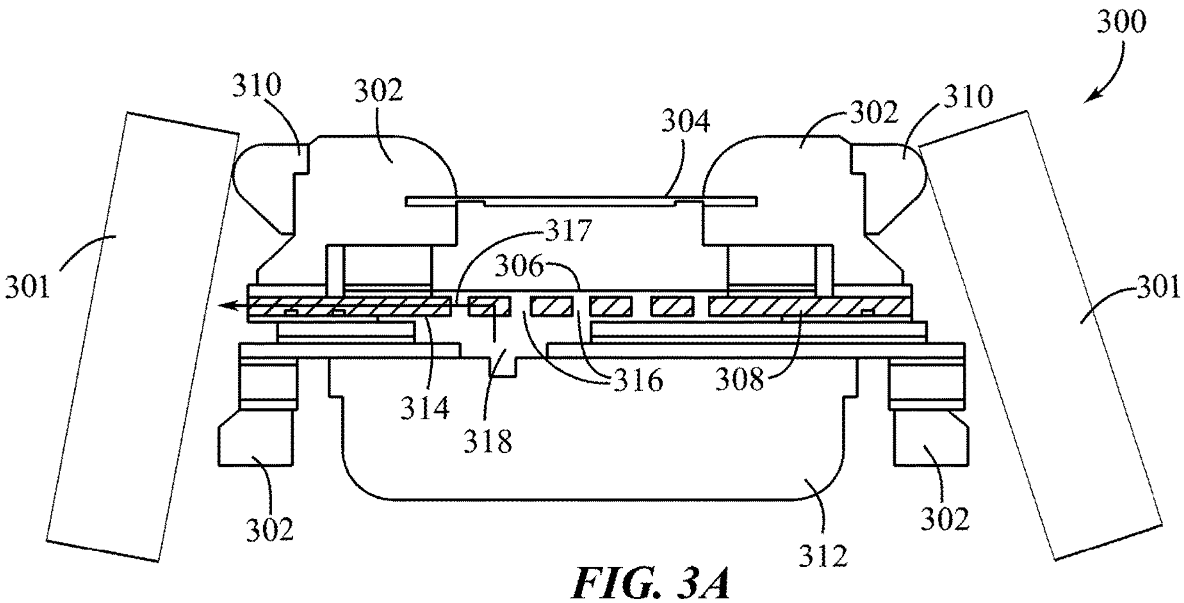
FIG. 3A shows a cross-sectional side view of an audio component assembly.

FIG. 3A shows a cross-sectional view of an audio component assembly 300 disposed within a housing 301 of a portable electronic device. The audio component assembly 300 can include a case 302, a grill 304, a membrane 306, a venting element 308, a gasket or seal 310, and electrical components 312. The case 302 can include substantially similar features and functionality as other cases described herein, for example, the case 202. The grill 304 can include substantially similar features and functionality as other grills described herein, for example, the grill 204. The membrane 306 can include substantially similar features and functionality as other membranes described herein, for example, the membrane 206. The seal 310 can include substantially similar features and functionality as other seals described herein, for example, the seal 210. The electrical components 312 can include substantially similar features and functionality as other electrical components described herein, for example, the electrical components 212.

In some examples, the venting element 308 can include a fluid impermeable layer 314 and one or more apertures 316 extending through the venting element 308. In some examples, the fluid impermeable layer 314 can define a surface of the venting element 308. The fluid impermeable layer 314 can include a heat-activated film (HAF), a pressure sensitive adhesive tape (PSA), a thermoplastic elastomer (TPE), a combination thereof, or any another polymer-based material.

Figure 3B:
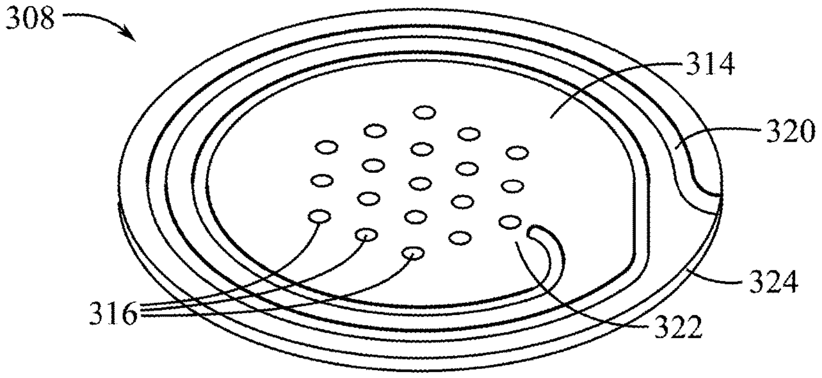
FIG. 3B shows a top perspective view of a venting element.

As shown in FIG. 3B, the venting element 308 can be planar and form a circular profile. While the venting element 308 depicted in FIG. 3B has a circular profile, the venting element 308 can have a profile resembling any geometric shape, such as, circular, ellipsoidal, rectangular, trapezoidal, triangular, a combination thereof, or any other geometric shape. The one or more apertures 316 can enable fluid communication between the membrane 306 and the electrical components 312. For example, movement of the membrane 306 can cause air to travel through an internal volume 318 formed within the audio component assembly 300. In the present example, the venting element 308 can function as a membrane support, as described herein.

The venting element 308 can function as a venting element which defines or forms a fluid path (depicted as arrow 317 in FIG. 3A) that extends parallel or substantially parallel to the fluid impermeable layer 314. The fluid path can place the internal volume 318 of the audio component assembly 300 in fluid communication with a volume outside of the audio component assembly 300. For example, the fluid impermeable layer 314 can form or define a channel 320 which acts as the fluid path for placing the internal volume 318 in fluid communication with another volume outside of the audio component assembly 300. The channel 320 can spiral from a central portion 322 of the venting element 308 to a periphery 324 of the venting element 308. While the channel 320 is depicted as a spiral in FIG. 3B, those skilled in the art will readily appreciate that the fluid path can be defined by one or more channels having any one of a multitude of shapes, lengths, and positions about the fluid impermeable layer 314. In some examples, the venting element 308 can include one or more linear and/or curved channels each extending radially from the central portion 322 of the venting element 308 to the periphery 324 of the venting element 308.

In some examples, the channel 320 can enable air to flow through the channel 320 to regulate a relative pressure within the internal volume 318 of the audio component assembly 300. Additionally, or alternatively, the channel 320 can attenuate acoustic waves traveling within the channel 320 to reduce or prevent a loss in the functionality of the audio component assembly 300. For example, the audio component assembly 300 can be disposed within a housing 301 of a portable electronic device and required to vent through the same portion of the housing 301 that forms the back-volume for a speaker of the portable electronic device. In this example, the fluid path defined by the channel 320 to vent relative pressure can also enable acoustic waves from the speaker to travel to the audio component assembly 300 (e.g., through the fluid path) and thereby decrease or diminish the functionality of the audio component assembly 300. Thus, the channel 320 can be designed to reduce or otherwise attenuate acoustic waves travelling through the channel 320. For example, attributes of the channel 320 can be varied such that the channel 320 acts as a low pass filter which attenuates or reduces acoustic waves having wavelengths above 20 Hz.

Attributes of the channel 320 can include a width, a length, a depth, a cross-sectional geometry, or a combination thereof. Any of the width, the depth, and/or the cross-sectional geometry of the channel 320 can vary along the length of the channel 320, for example, the width of the channel 320 can be narrower near the periphery 324 of the venting element 308 and broader near the central portion 322 of the venting element 308. Similarly, the depth of the channel can be shallower near the periphery 324 of the venting element 308 and deeper near the central portion 322 of the venting element 308. The cross-sectional shape (e.g., a shape of the channel 320 taken through the channel's length) can be rectangular, trapezoidal, circular, ellipsoidal, triangular, or any other geometric shape. Moreover, in some examples, the cross-sectional shape of the channel 320 can vary along the length of the channel 320.

Figure 3C:
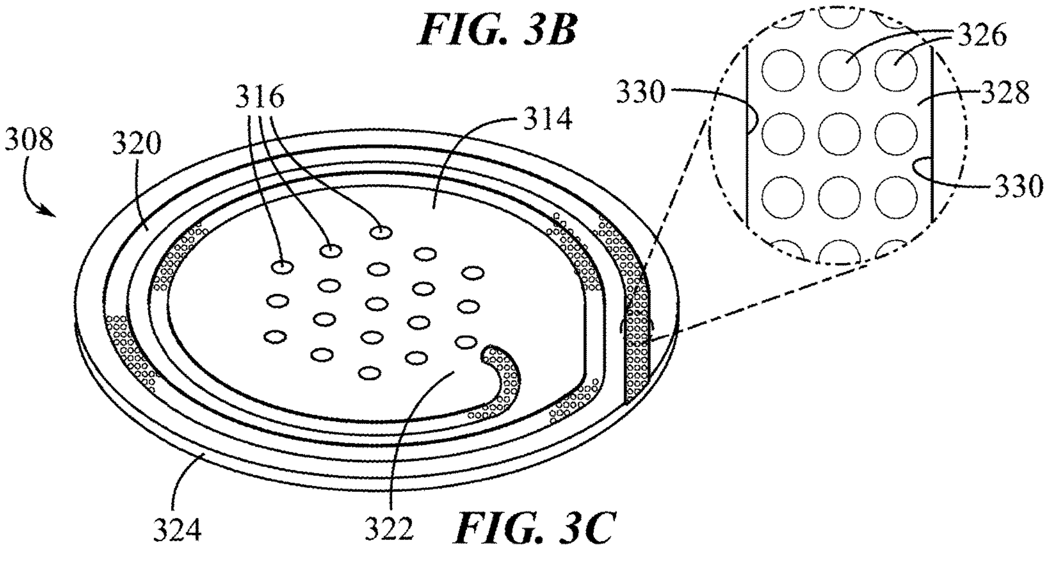
FIG. 3C shows a top perspective view of a venting element.

In some examples, the venting element 308 can include one or more protrusions positioned along a length of the channel 320. As shown in FIG. 3C, the venting element 308 can include multiple protrusions 326 disposed on a floor or base 328 of the channel 320. The protrusions 326 can be disposed within the channel 320 to attenuate or further attenuate acoustic waves traveling through the channel 320. Additionally, or alternatively, one or more of the protrusions 326 can be disposed on a sidewall 330 of the channel 320 to attenuate or further attenuate acoustic waves traveling through the channel 320. Each of the protrusions 326 can extend from the base 328 and/or sidewall 330 of the channel 320. The protrusions 326 can be deposited, printed, machined, adhered, affixed, etched, molded, or otherwise disposed on the base 328 and/or the sidewall 330 of the channel 320.

While the channel 320 is described as being formed on the fluid impermeable layer 314 of the venting element 308, in other examples, the channel 320 can also or alternatively be formed on a fluid impermeable layer of a separate and distinct venting element disposed adjacent the venting element 308.

Any number or variety of components in any of the configurations described herein can be included in the portable electronic device. The components can include any combination of the features described herein and can be arranged in any of the various configurations described herein. The structure and arrangement of components of a portable electronic device having a housing with structures described herein, and defining an internal volume, as well as the concepts regarding membranes and fluid paths, can apply not only to the specific examples discussed herein, but to any number of examples in any combination. Examples of audio component assemblies of a portable electronic device including a venting element are described below, with reference to FIGS. 4A-7F.

Figure 4A:
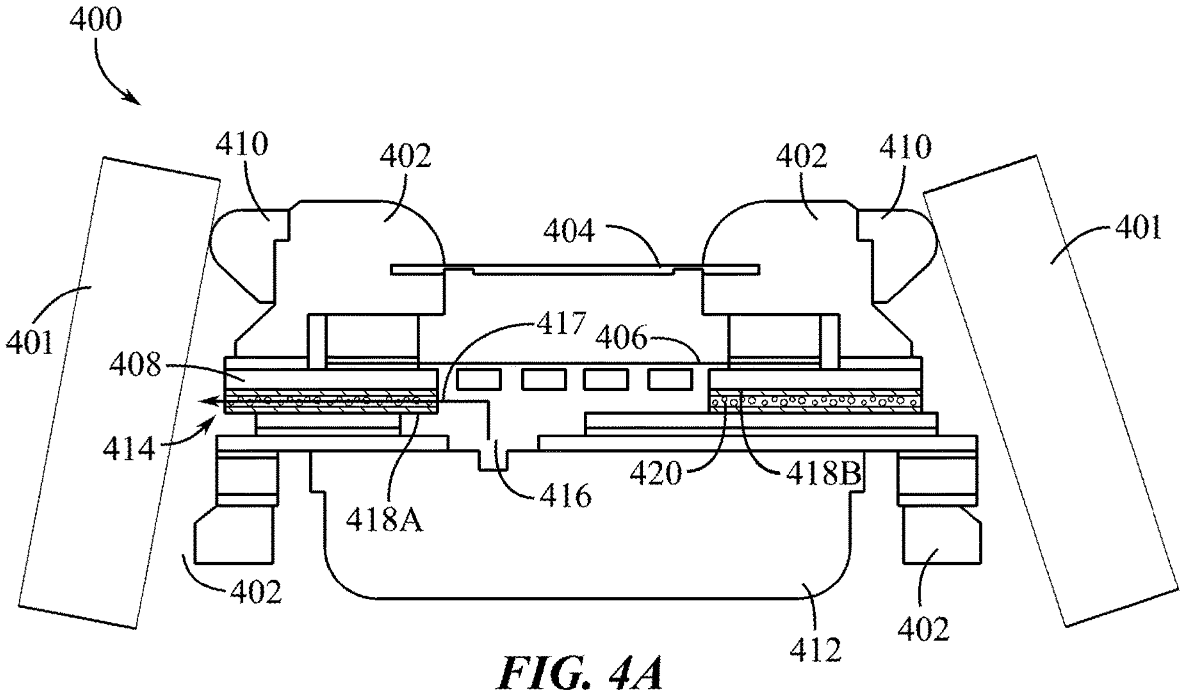
FIG. 4A shows a cross-sectional side view of an audio component assembly.

FIG. 4A shows a cross-sectional view of an audio component assembly 400 disposed within a housing 401 of a portable electronic device. The audio component assembly 400 can include a case 402, a grill 404, a membrane 406, a membrane support 408, a gasket or seal 410, electrical components 412, and a venting element 414. The case 402 can include substantially similar features and functionality as other cases described herein, for example, the case 202, 302. The grill 404 can include substantially similar features and functionality as other grills described herein, for example, the grill 204, 304. The membrane 406 can include substantially similar features and functionality as other membranes described herein, for example, the membrane 206, 306. The membrane support 408 can include substantially similar features and functionality as other membrane supports described herein, for example, the grill 208, 308. Alternatively, the membrane support 408 can be devoid of any channels (e.g., channel 320) and simply provide support to the membrane as a stiffener (e.g., limiting inelastic deformation of the membrane 406). The seal 410 can include substantially similar features and functionality as other seals described herein, for example, the seal 210, 310. The electrical components 412 can include substantially similar features and functionality as other electrical components described herein, for example, the electrical components 212, 312.

Figure 4B:
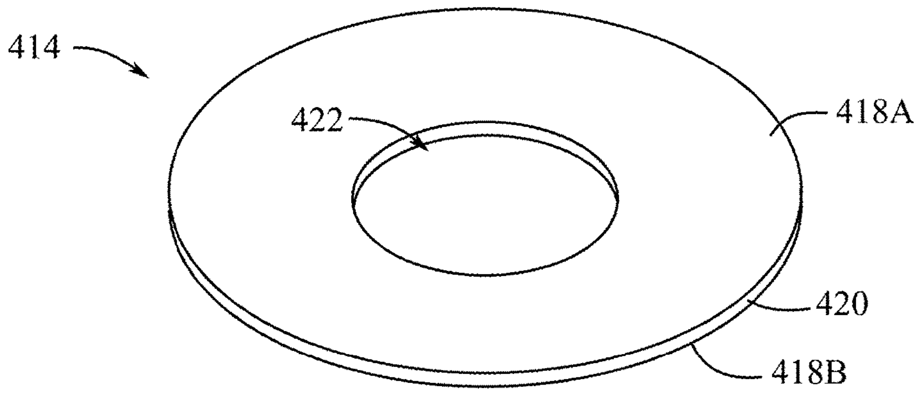
FIG. 4B shows a top perspective view of a venting element.
Figure 4C:
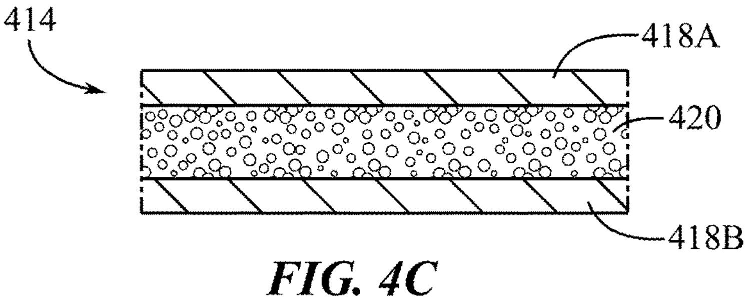
FIG. 4C shows a cross-sectional side view of the venting element of FIG. 4B.

In some examples, the venting element 414 can be disposed adjacent the membrane support 408 and define a fluid path (depicted as arrow 417 in FIG. 4A) which places an internal volume 416 of the audio component assembly 400 in fluid communication with a volume outside of the audio component assembly 400. As shown in FIGS. 4A-4C, the venting element 414 can include a first fluid impermeable layer 418A, a second fluid impermeable layer 418B, and a porous material 420 disposed between the first and second fluid impermeable layers 418A, 418B. In some examples, the fluid impermeable layers 418A, 418B can define surfaces of the venting element 414. The porous material 420 can include metals, metal alloys, polymers, ceramics, or combinations thereof. For example, the porous material 420 can be made of a metal foam. The porous material 420 can be adhered or otherwise affixed to the first and second fluid impermeable layers 418A, 418B, for example, with adhesive, molding, welding, printing, or any other mechanism for affixing the first and second fluid impermeable layers 418A, 418B to the porous material 420. The fluid path can extend from a central aperture 422 of the venting element 414 to a periphery 424 of the venting element 414. One or more of the fluid impermeable layers 418A, 418B can include a heat-activated film (HAF), a pressure sensitive adhesive tape (PSA), a thermoplastic elastomer (TPE), a combination thereof, or any another polymer-based material.

Additionally, or alternatively, the porous material 420 can attenuate acoustic waves traveling within the venting element 414 to reduce or prevent a loss in the functionality of the audio component assembly 400. For example, the audio component assembly 400 can be disposed within a housing 401 of a portable electronic device and required to vent through the same portion of the housing 401 that forms the back-volume for a speaker of the portable electronic device. In this example, the fluid path defined by the venting element 414 to vent relative pressure can also enable acoustic waves from the speaker to travel to the audio component assembly 400 (e.g., through the fluid path) and thereby decrease or diminish the functionality of the audio component assembly 400. Thus, the venting element 414 can be designed to reduce or otherwise attenuate acoustic waves travelling through the venting element 414. For example, attributes of the venting element 414 can be varied such that the venting element 414 acts as a low pass filter which attenuates or reduces acoustic waves having wavelengths above 20 Hz.

Attributes of the venting element 414 can include a porosity of the porous material 420, a thickness of the porous material 420, a diameter of the central aperture 422, or a combination thereof. For example, relatively more fluid flow can be achieved through the venting element 414 when the porous material 420 has a relatively larger thickness and/or includes a material having a relatively high porosity.

As shown in FIG. 4B, the venting element can be planar and form a circular profile. While the venting element depicted in FIG. 4B has a circular profile, the venting element 414 can have a profile resembling any geometric shape, such as, circular, ellipsoidal, rectangular, trapezoidal, triangular, a combination thereof, or any other geometric shape. The central aperture 422 can enable fluid communication between the membrane 406 and the electrical components 412. For example, movement of the membrane 406 can cause air to travel through the internal volume 416 formed within the audio component assembly 400.

While the fluid path is described as being formed within the venting element 414, in other examples, the fluid path can also or alternatively be formed within the membrane support 408. For example, the membrane support 408 can include a porous material disposed between first and second fluid impermeable layers.

Figure 5A:
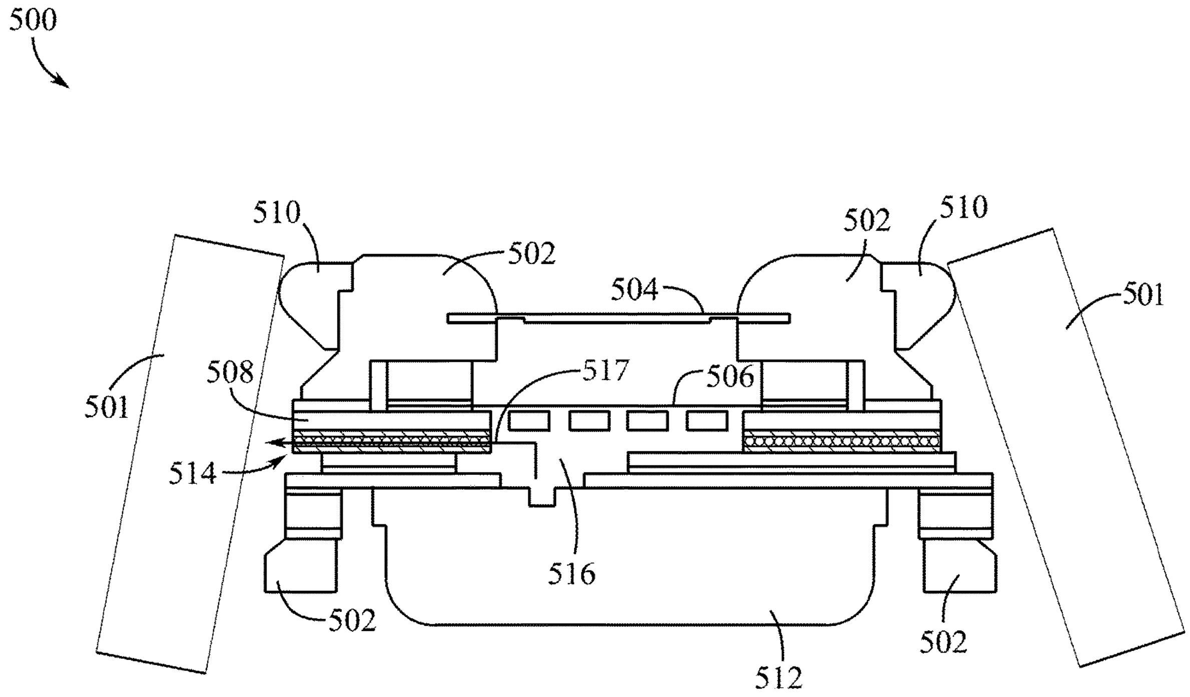
FIG. 5A shows a cross-sectional side view of an audio component assembly.

FIG. 5A shows a cross-sectional view of an audio component assembly 500 disposed within a housing 501 of a portable electronic device. The audio component assembly 500 can include a case 502, a grill 504, a membrane 506, a membrane support 508, a gasket or seal 510, electrical components 512, and a venting element 514. The case 502 can include substantially similar features and functionality as other cases described herein, for example, the case 202, 302, 402. The grill 504 can include substantially similar features and functionality as other grills described herein, for example, the grill 204, 304, 404. The membrane 506 can include substantially similar features and functionality as other membranes described herein, for example, the membrane 206, 306, 406. The membrane support 508 can include substantially similar features and functionality as other membrane supports described herein, for example, the grill 208, 308. Alternatively, the membrane support 508 can be devoid of any channels (e.g., channel 320) and simply provide support to the membrane as a stiffener (e.g., limiting inelastic deformation of the membrane 506). The seal 510 can include substantially similar features and functionality as other seals described herein, for example, the seal 210, 310, 410. The electrical components 512 can include substantially similar features and functionality as other electrical components described herein, for example, the electrical components 212, 312, 412.

Figure 5B:
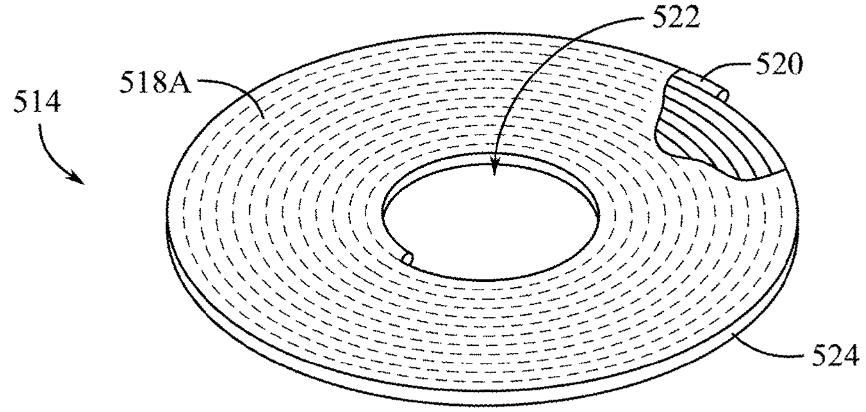
FIG. 5B shows a top perspective view of a venting element.
Figure 5C:
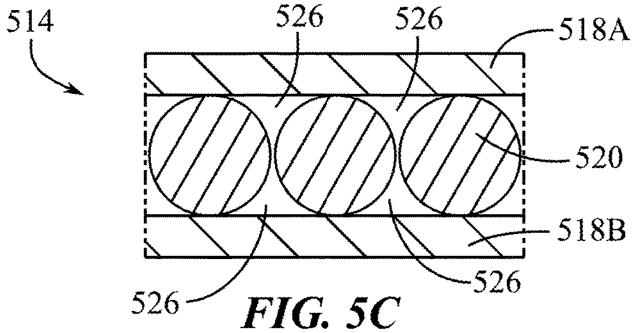
FIG. 5C shows a cross-sectional side view of the venting element of FIG. 5B.

In some examples, the venting element 514 can be disposed adjacent the membrane support 508 and define a fluid path which places an internal volume 516 of the audio component assembly 500 in fluid communication with a volume outside of the audio component assembly 500. As shown in FIGS. 5A-5C, the venting element 514 can include a first fluid impermeable layer 518A, a second fluid impermeable layer 518B, and a coil 520 disposed between the first and second fluid impermeable layers 518A, 518B. In some examples, the fluid impermeable layers 518A, 518B can define surfaces of the venting element 514. The coil 520 can include metals, metal alloys, polymers, ceramics, or combinations thereof. For example, the coil 520 can be a coiled copper wire having a diameter of about 50 microns, less than 10 microns, between about 10 microns and about 20 microns, between about 20 microns and about 40 microns, between about 40 microns and about 60 microns, or less than about 200 microns.

The coil 520 can be adhered or otherwise affixed to the first and second fluid impermeable layers 518A, 518B using adhesive, welding, fasteners, molding, or a combination thereof. The coil 520 and the first and second fluid impermeable layers 518A, 518B can form gaps 526 within the venting element 514 which can define one or more fluid paths (depicted as arrow 517 in FIG. 5A) through venting element 514. The fluid path defined by the venting element 514 can extend from a central aperture 522 of the venting element 514 to a periphery 524 of the venting element 514. One or more of the fluid impermeable layers 518A, 518B can include a heat-activated film (HAF), a pressure sensitive adhesive tape (PSA), a thermoplastic elastomer (TPE), a combination thereof, or any another polymer-based material.

Additionally, or alternatively, the venting element 514 can attenuate acoustic waves to reduce or prevent a loss in the functionality of the audio component assembly 500. For example, the audio component assembly 500 can be disposed within a housing 501 of a portable electronic device and required to vent through the same portion of the housing 501 that forms the back-volume for a speaker of the portable electronic device. In this example, the fluid path defined by the venting element 514 to vent relative pressure can also enable acoustic waves from the speaker to travel to the audio component assembly 500 (e.g., through the fluid path) and thereby decrease or diminish the functionality of the audio component assembly 500. Thus, the venting element 514 can be designed to reduce or otherwise attenuate acoustic waves travelling through the venting element 514. For example, attributes of the venting element 514 can be varied such that the venting element 514 acts as a low pass filter which attenuates or reduces acoustic waves having wavelengths above 20 Hz.

Attributes of the venting element 514 can include a diameter of the coil 520, a cross-sectional shape of the coil 520, a size or volume of the gaps 526, a diameter of the central aperture 522, a number of turns that forms the coil 520, or a combination thereof. For example, relatively more fluid flow can be achieved through the venting element 514 when the gaps 526 formed between the coil 520 and the first and second fluid impermeable layers 518A, 518B define a relatively large volume. Accordingly, the diameter of the coil 520, the cross-sectional shape of the coil 520, or a combination thereof can be manipulated to allow greater fluid flow through the gaps 526 within the venting element 514.

As shown in FIG. 5B, the venting element 514 can be planar and form a circular profile. While the venting element depicted in FIG. 5B has a circular profile, the venting element 514 can have a profile resembling any geometric shape, such as, circular, ellipsoidal, rectangular, trapezoidal, triangular, a combination thereof, or any other geometric shape. The central aperture 522 can enable fluid communication between the membrane 506 and the electrical components 512. For example, movement of the membrane 506 can cause air to travel through the internal volume 516 formed within the audio component assembly 500.

While the fluid path is described as being formed within the venting element 514, in other examples, the fluid path can also or alternatively be formed within the membrane support 508. For example, the membrane support 508 can include a coil disposed between first and second fluid impermeable layers.

Figure 6A:
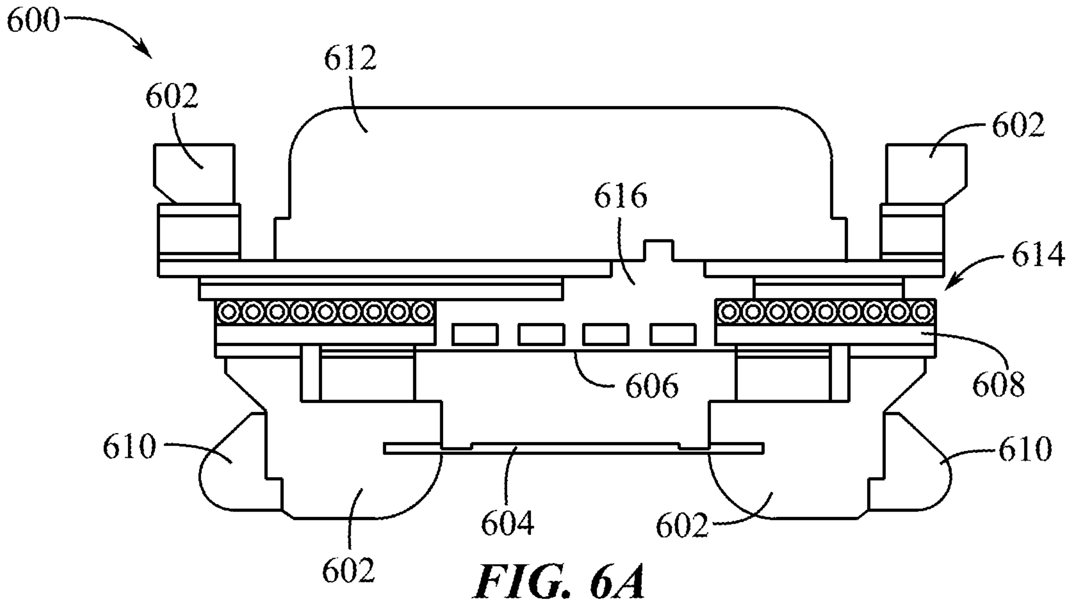
FIG. 6A shows a cross-sectional side view of an audio component assembly.

FIG. 6A shows a cross-sectional view of an audio component assembly 600. The audio component assembly 600 can include a case 602, a grill 604, a membrane 606, a membrane support 608, a gasket or seal 610, electrical components 612, and a venting element 614. The case 602 can include substantially similar features and functionality as other cases described herein, for example, the case 202, 302, 402, 502. The grill 604 can include substantially similar features and functionality as other grills described herein, for example, the grill 204, 304, 404, 504. The membrane 606 can include substantially similar features and functionality as other membranes described herein, for example, the membrane 206, 306, 406, 506. The membrane support 608 can include substantially similar features and functionality as other membrane supports described herein, for example, the grill 208, 308, 408, 508. Alternatively, the membrane support 608 can be devoid of any channels (e.g., channel 320) and simply provide support to the membrane as a stiffener (e.g., limiting inelastic deformation of the membrane 606). The seal 610 can include substantially similar features and functionality as other seals described herein, for example, the seal 210, 310, 410, 510. The electrical components 612 can include substantially similar features and functionality as other electrical components described herein, for example, the electrical components 212, 312, 412, 512.

Figure 6B:
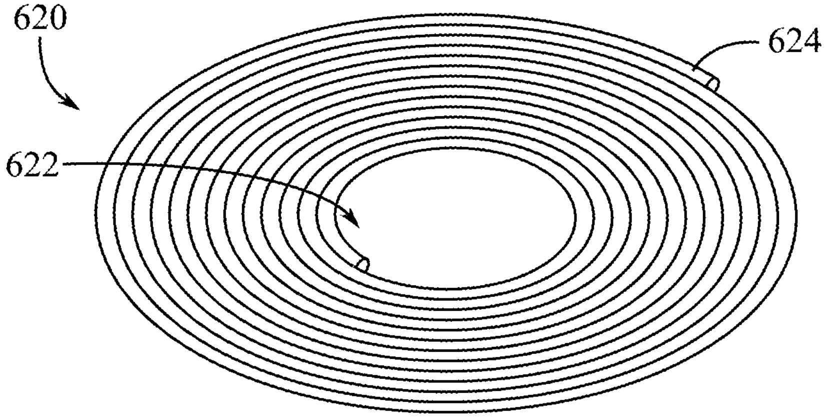
FIG. 6B shows a top perspective view of a venting element.
Figure 6C:
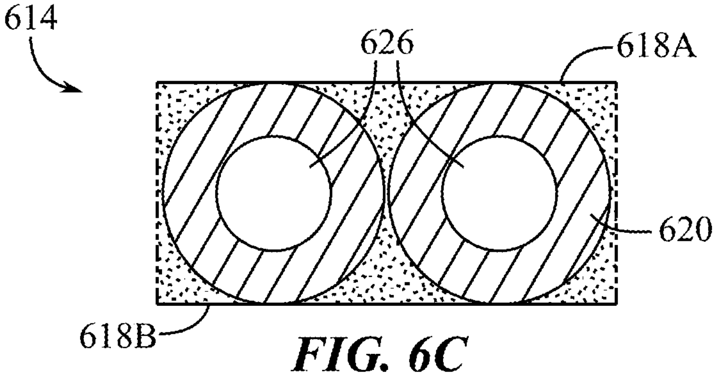
FIG. 6C shows a cross-sectional side view of the venting element of FIG. 6B.

In some examples, the venting element 614 can be disposed adjacent the membrane support 608 and define a fluid path which places an internal volume 616 of the audio component assembly 600 in fluid communication with a volume outside of the audio component assembly 600. As shown in FIGS. 6A-6C, the venting element 614 can include a first fluid impermeable layer 618A, a second fluid impermeable layer 618B, and a coiled tube 620 disposed between the first and second fluid impermeable layers 618A, 618B. In some examples, the fluid impermeable layers 618A, 618B can define surfaces of the venting element 614. The coiled tube 620 can include metals, metal alloys, polymers, ceramics, or combinations thereof. For example, the coiled tube 620 can include a metal alloy tube coiled about a central axis. In some examples, the first and second fluid impermeable layers 618A, 618B can include a resin or curable adhesive which is poured over the coiled tube 620 to form the venting element 614. As shown in FIG. 6C, the first and second fluid impermeable layers 618A, 618B can be formed from a singular material which envelops the coiled tube 620. Alternatively, the first and second fluid impermeable layers 618A, 618B can be formed from distinct segments of a material, such as, polytetrafluoroethylene (PTFE) or some other polymer which is adhered or otherwise affixed to the coiled tubing 620 using adhesive, welding, fasteners, molding, or a combination thereof. The coiled tube 620 can form a conduit 626 (i.e., a fluid path) extending from a central aperture 622 of the venting element 614 to a periphery 624 of the venting element 614. The conduit 626 can be about 50 microns in diameter, less than 10 microns, between about 10 microns and about 20 microns, between about 20 microns and about 40 microns, between about 40 microns and about 60 microns, or less than about 200 microns in diameter.

Additionally, or alternatively, the venting element 614 can attenuate acoustic waves to reduce or prevent a loss in the functionality of the audio component assembly 600. For example, the audio component assembly 600 can be disposed within a housing of a portable electronic device and required to vent through the same portion of the housing that forms the back-volume for a speaker of the portable electronic device. In this example, the fluid path defined by the venting element 614 to vent relative pressure can also enable acoustic waves from the speaker to travel to the audio component assembly 600 (e.g., through the fluid path) and thereby decrease or diminish the functionality of the audio component assembly 600. Thus, the venting element 614 can be designed to reduce or otherwise attenuate acoustic waves travelling through the venting element 614. For example, attributes of the venting element 614 can be varied such that the venting element 514 acts as a low pass filter which attenuates or reduces acoustic waves having wavelengths above 20 Hz.

Attributes of the venting element 614 can include an outer diameter of the coiled tube 620, a cross-sectional shape of the coiled tube 620, an inner diameter of the coiled tube 620 (e.g., the diameter of the conduit 626), a diameter of the central aperture 622, or a combination thereof. For example, relatively more fluid flow can be achieved through the venting element 614 when the inner diameter of the coiled tube 620 (e.g., the diameter of the conduit 626) is relatively large. Accordingly, the diameter of the conduit 626 can be chosen which allows a greater quantity of fluid flow through the venting element 614.

As shown in FIG. 6B, the venting element 614 can be planar and form a circular profile. While the venting element depicted in FIG. 6B has a circular profile, the venting element 614 can have a profile resembling any geometric shape, such as, circular, ellipsoidal, rectangular, trapezoidal, triangular, a combination thereof, or any other geometric shape. The central aperture 622 can enable fluid communication between the membrane 606 and the electrical components 612. For example, movement of the membrane 606 can cause air to travel through the internal volume 616 formed within the audio component assembly 600.

While the fluid path is described as being formed within the venting element 614, in other examples, the fluid path can also or alternatively be formed within the membrane support 608. For example, the membrane support 608 can include a coiled tube disposed between first and second fluid impermeable layers.

Figure 7A:
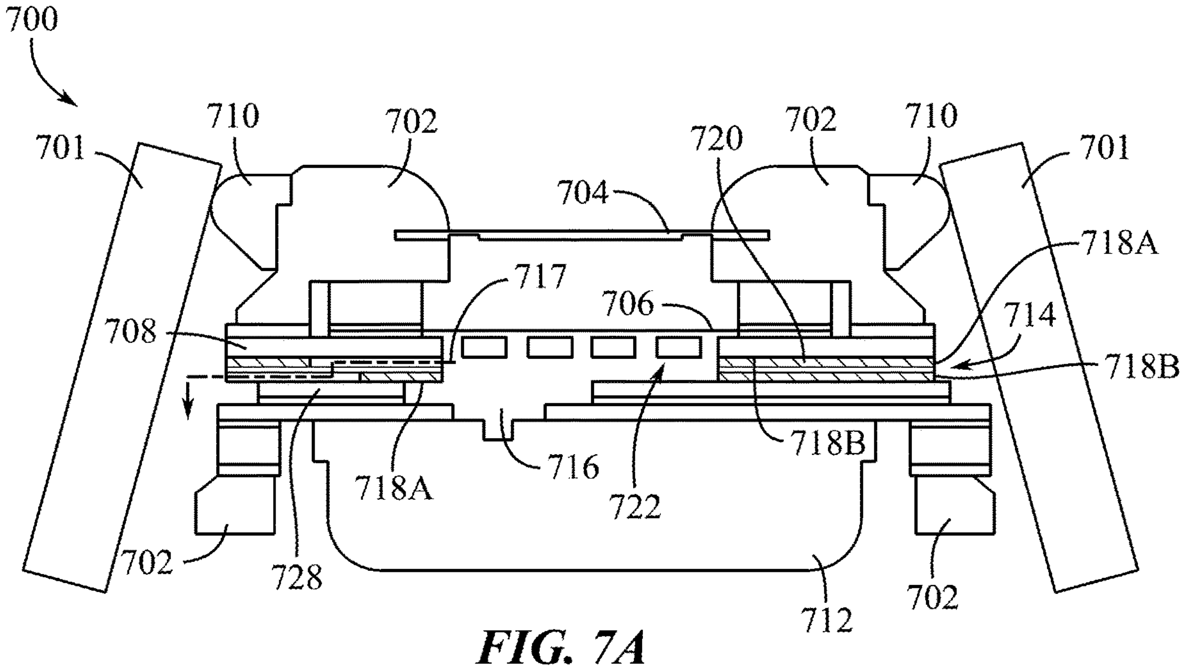
FIG. 7A shows a cross-sectional side view of an audio component assembly.

FIG. 7A shows a cross-sectional view of an audio component assembly 700 disposed within a housing 701 of a portable electronic device. The audio component assembly 700 can include a case 702, a grill 704, a membrane 706, a membrane support 708, a gasket or seal 710, electrical components 712, and a venting element 714. The case 702 can include substantially similar features and functionality as other cases described herein, for example, the case 202, 302, 402, 502. The grill 704 can include substantially similar features and functionality as other grills described herein, for example, the grill 204, 304, 404, 504. The membrane 706 can include substantially similar features and functionality as other membranes described herein, for example, the membrane 206, 306, 406, 506. The membrane support 708 can include substantially similar features and functionality as other membrane supports described herein, for example, the grill 208, 308, 408, 508. Alternatively, the membrane support 708 can be devoid of any channels (e.g., channel 320) and simply provide support to the membrane as a stiffener (e.g., limiting inelastic deformation of the membrane 706). The seal 710 can include substantially similar features and functionality as other seals described herein, for example, the seal 210, 310, 410, 510. The electrical components 712 can include substantially similar features and functionality as other electrical components described herein, for example, the electrical components 212, 312, 412, 512.

Figure 7B:
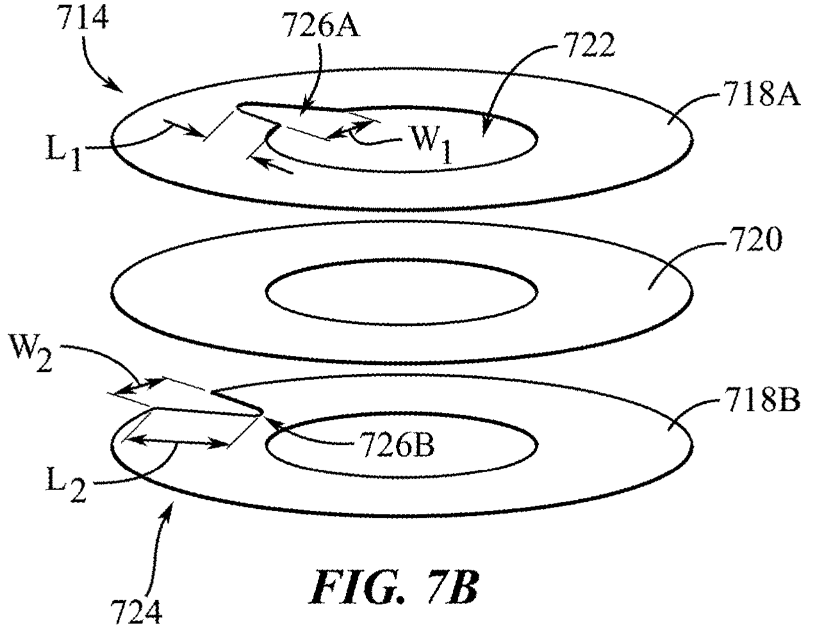
FIG. 7B shows an exploded view of a venting element.
Figure 7C:
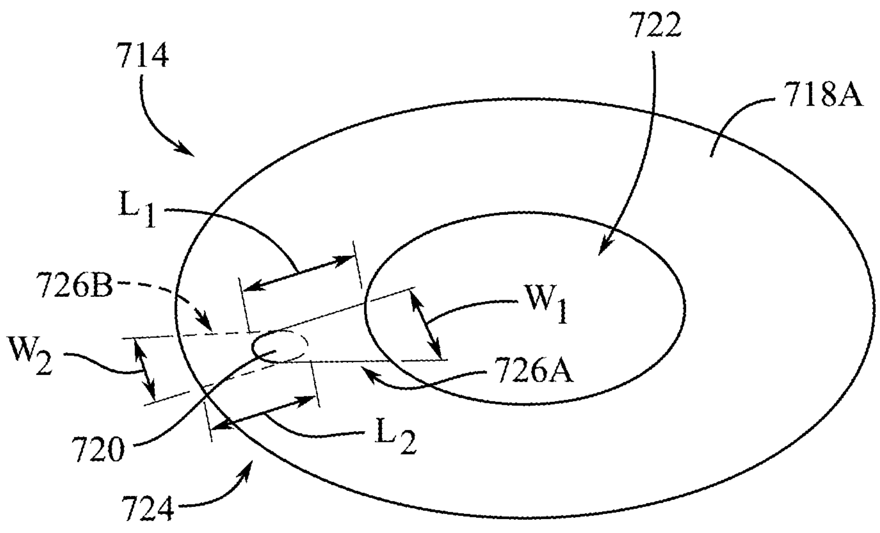
FIG. 7C shows a top perspective view of the venting element of FIG. 7B.

As shown in FIG. 7B, the venting element 714 can be planar and form a circular profile. While the venting element 714 depicted in FIG. 7B has a circular profile, the venting element 714 can have a profile resembling any geometric shape, such as, circular, ellipsoidal, rectangular, trapezoidal, triangular, a combination thereof, or any other geometric shape. The central aperture 722 can enable fluid communication between the membrane 706 and the electrical components 712. For example, movement of the membrane 706 can cause air to travel through the internal volume 716 formed within the audio component assembly 700.

While the fluid path is described as being formed within the venting element 714, in other examples, the fluid path can also or alternatively be formed within the membrane support 708. For example, the membrane support 708 can include a porous material disposed between first and second fluid impermeable layers.

In some examples, the venting element 714 can be disposed adjacent the membrane support 708 and define a fluid path (depicted as arrow 717 in FIGS. 7A and 7F) which places an internal volume 716 of the audio component assembly 700 in fluid communication with a volume outside of the audio component assembly 700. As shown in FIGS. 7A-7F, the venting element 714 can include a first fluid impermeable layer 718A, a second fluid impermeable layer 718B, and a fluid permeable intermediate layer 720 disposed between the first and second fluid impermeable layers 718A, 718B. In some examples, the fluid impermeable layers 718A, 718B can define surfaces of the venting element 714. The fluid permeable intermediate layer 720 can include metals, metal alloys, polymers, ceramics, or combinations thereof. For example, the fluid permeable intermediate layer 720 can be made of a porous metal such as a metal foam, a thermoplastic vulcanizate (TPV), or any other fluid permeable material. The fluid permeable intermediate layer 720 can be adhered or otherwise affixed to the first and second fluid impermeable layers 718A, 718B, for example, with adhesive, molding, welding, printing, or any other mechanism for affixing the first and second fluid impermeable layers 718A, 718B to the fluid permeable intermediate layer 720. One or more of the fluid impermeable layers 718A, 718B can include a heat-activated film (HAF), a pressure sensitive adhesive tape (PSA), a thermoplastic elastomer (TPE), a combination thereof, or any another polymer-based material.

In examples, the fluid path can extend from a central aperture 722 or center portion of the venting element 714 to a periphery 724 of the venting element 714. For example, the first fluid impermeable layer 718A can at least partially form a first channel 726A extending into the first fluid impermeable layer 718A from the central aperture 722. In some examples, the first channel 726A can be formed by the first fluid impermeable layer 718A and another component of the audio component assembly 700 (e.g., the membrane support 708, or a pressure sensitive adhesive (PSA) between components of the audio component assembly). The first channel 726A can have a width $W_1$ that varies along a length $L_1$ of the first channel 726A. For example, the width $W_1$ of the first channel 726A can be greater or wider adjacent the central aperture 722 and narrow as the first channel 726A extends toward the periphery 724.

In examples, the second fluid impermeable layer 718B can at least partially form a second channel 726B extending into the second fluid impermeable layer 718B from the periphery 724. In some examples, the second channel 726B can be formed by the second fluid impermeable layer 718B and another component of the audio component assembly 700 (e.g., a spacer 728, or a pressure sensitive adhesive (PSA) between components of the audio component assembly). The second channel 726B can have a width $W_2$ that varies along a length $L_2$ of the second channel 726B. For example, the width $W_2$ of the second channel 726B can be greater or wider adjacent the periphery 724 and narrow as the second channel 726B extends toward the central aperture 722.

As illustrated in FIGS. 7B-7E, in some examples, each of the first and second channels 726A, 726B can be flared or spread to ease alignment of the first and second channels 726A, 726B during manufacturing. In other words, the first and second channels 726A, 726B can be slightly misaligned but still form the fluid path because less manufacturing accuracy is required to overlap the flared profile of each of the first and second channels 726A, 726B. While the first and second channels are illustrated in FIGS. 7B-7E as triangular or flared, the profile or shape of each of the first and second channels 726A, 726B can resemble any geometric shape capable of providing the features disclosed herein. For example, one or more of the first and second channels 726A, 726B can resemble a triangle, circle, square, rectangle, trapezoid, rhombus, oval, pentagon, another geometric shape, a free-form shape, or a combination thereof.

Figure 7D:
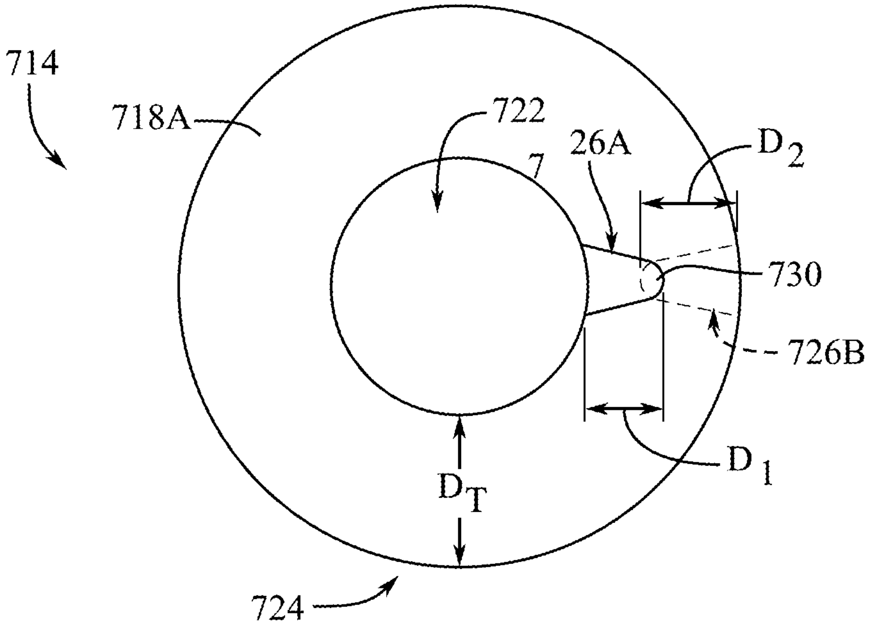
FIG. 7D shows a top view of an example of a venting element.

FIG. 7D shows top view of the venting element 714 including a region 730 of the fluid permeable intermediate layer 720 disposed between the first channel 726A and the second channel 726B. In other words, the first and second channels 726A, 726B overlap on either side of the fluid permeable intermediate layer 720 to form the region 730 which allows fluid (e.g., air) to flow between the first and second channels 726A, 726B. For example, the first channel 726A can extend a distance $D_1$ into the first fluid impermeable layer 718A from the central aperture 722 and the second channel 726B can extend a distance $D_2$ into the second fluid impermeable layer 718B from the periphery 724. The sum of the distances $D_1$, $D_2$ can be greater than a total distance $D_T$ between the periphery 724 and the central aperture 722 such that the region 730 enables fluid (e.g., air) to flow between the first and second channels 726A, 726B. The first and second channels 726A, 726B and the region 730 can form at least a portion of the fluid path that enables pressure within the volume 716 to vent, for example, when the membrane 706 is biased by atmospheric pressure of an environment external to the portable electronic device.

In some examples, the distances $D_1$, $D_2$ can be equivalent or substantially equivalent. When the distance $D_1$ is equivalent or substantially equivalent to the distance $D_2$, the region 730 can be centered about the total distance $D_T$ (e.g., centered about halfway between the periphery 724 and the central aperture 722). In some examples, the distance $D_1$ can be greater or smaller than the distance $D_2$. When the distance $D_1$ is greater or smaller than the distance $D_2$, the region 730 can be positioned closer to either the central aperture 722 or the periphery 724. For example, when the distance $D_1$ is greater than the distance $D_2$, the region 730 can be positioned nearer or closer to the periphery 724 than the central aperture 722.

Figure 7E:
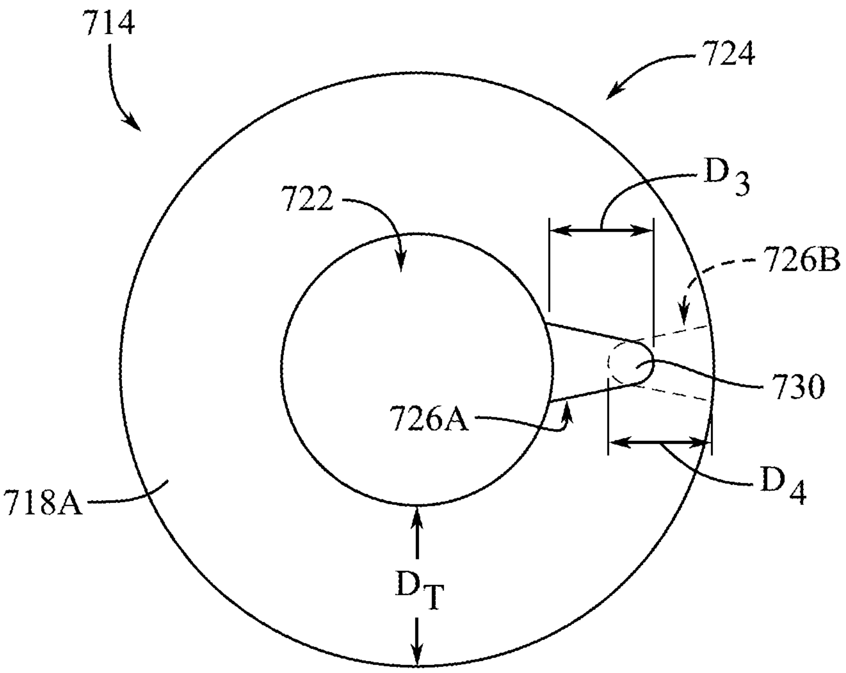
FIG. 7E shows a top view of another example of a venting element.

The respective distances (e.g., distance $D_1$ and distance $D_2$) to which the first and second channels 726A, 726B extend can form or define a size and a shape of the region 730. For example, as shown in FIG. 7E, relatively larger distances (e.g., distance $D_3$ and distance $D_4$) can form a relatively larger region 730 (i.e., larger than the region 730 formed by the distances $D_1$, $D_2$ shown in FIG. 7D). The size of the region 730 of the fluid permeable intermediate layer 720 that enables fluid communication between the first and second channels 726A, 726B can be at least 0.005 $mm^2$, about 0.005 $mm^2$ to about 0.01 $mm^2$, about 0.01 $mm^2$ to about 0.03 $mm^2$, about 0.03 $mm^2$ to about 0.05 $mm^2$, about 0.05 $mm^2$ to about 0.07 $mm^2$, about 0.07 $mm^2$ to about 0.1 $mm^2$, or greater than 0.1 $mm^2$.

The size of the region 730, a thickness of the fluid permeable intermediate layer 720, and the material or materials of the fluid permeable intermediate layer 720 can dictate the quantity of fluid that can pass through the fluid path. In some examples, the thickness of the fluid permeable intermediate layer 720 can be at least 5 μm, about 5 μm to about 15 μm, about 15 μm to about 20 μm, about 20 μm to about 25 μm, about 25 μm to about 30 μm, about 30 μm to about 40 μm, about 40 μm to about 60 μm, or greater than 60 μm. In some examples, an airflow rate along the fluid path defined by the venting element 714 can be at least 0.5 SCCM at 0.1 bar, about 1 SCCM at 0.1 bar to about 1.5 SCCM at 0.1 bar, about 1.5 SCCM at 0.1 bar to about 2 SCCM at 0.1 bar, about 2 SCCM at 0.1 bar to about 4 SCCM at 0.1 bar, about 4 SCCM at 0.1 bar to about 8 SCCM at 0.1 bar, or greater than 8 SCCM at 0.1 bar. While this range of airflow rates are described with reference to the examples shown in FIGS. 7A-7F, these airflow rates are equally applicable to the examples shown in FIGS. 2-6C and the examples shown in FIGS. 8-10.

Additionally, the fluid permeable intermediate layer 720 can attenuate acoustic waves traveling within the venting element 714 to reduce or prevent a loss in the functionality of the audio component assembly 700. For example, the audio component assembly 700 can be disposed within a housing 701 of a portable electronic device and required to vent through the same portion of the housing 701 that forms the back-volume for a speaker of the portable electronic device. In this example, the fluid path defined by the venting element 714 to vent relative pressure can also enable acoustic waves from the speaker to travel to the audio component assembly 700 (e.g., through the fluid path) and thereby decrease or diminish the functionality of the audio component assembly 700. Thus, the venting element 714 can be designed to reduce or otherwise attenuate acoustic waves travelling through the venting element 714. For example, attributes of the venting element 714 can be varied such that the venting element 714 acts as a low pass filter which attenuates or reduces acoustic waves having wavelengths above 20 Hz. Attributes of the venting element 714 can include a porosity or permeability of the fluid permeable intermediate layer 720, the thickness of the fluid permeable intermediate layer 720, a diameter of the central aperture 722, the area and size of the region 730, respective thicknesses of the first and second fluid impermeable layers 718A, 718B, or a combination thereof.

Figure 7F:
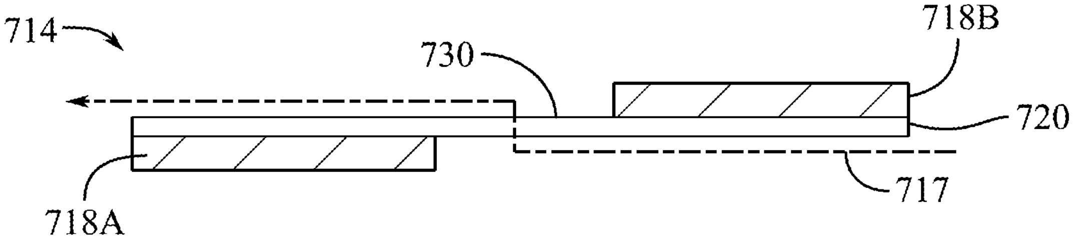
FIG. 7F shows a cross-sectional side view of the venting element of FIG. 7B.

FIG. 7F shows a cross-sectional view of the venting element 714 including the first and second fluid impermeable layers 718A, 718B, the fluid permeable intermediate layer 720, and the fluid path 717 extending through the region 730. In some examples, the portion of the fluid path 717 that extends through the fluid permeable intermediate layer 720 can be tortuous or nonlinear to attenuate or reflect acoustic waves propagating along the fluid path 717.

Any number or variety of components in any of the configurations described herein can be included in the portable electronic device. The components can include any combination of the features described herein and can be arranged in any of the various configurations described herein. The structure and arrangement of components of a portable electronic device having a housing with structures described herein, and defining an internal volume, as well as the concepts regarding membranes and fluid paths, can apply not only to the specific examples discussed herein, but to any number of examples in any combination. Examples of audio component assemblies of a portable electronic device including an enclosure are described below, with reference to FIGS. 8-10.

Figure 8:
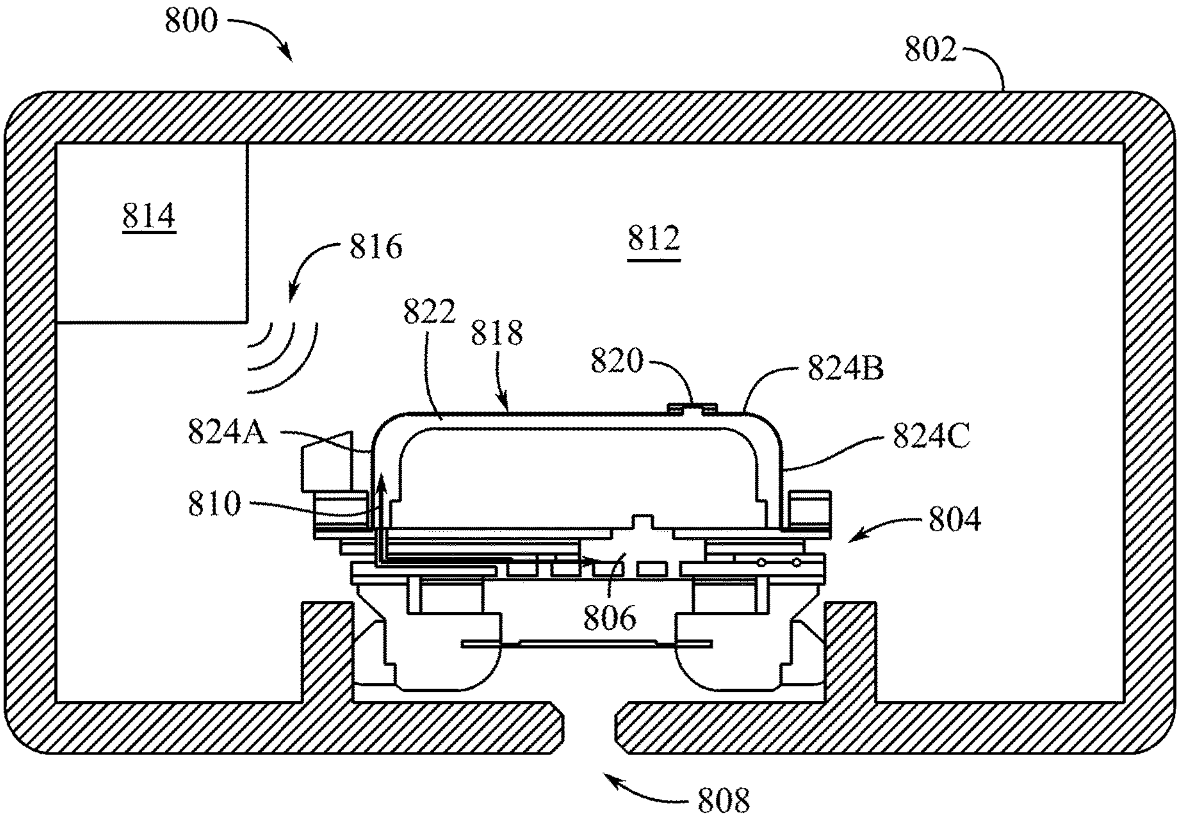
FIG. 8 shows a cross-sectional side view of a portable electronic device.

FIG. 8 shows a cross-sectional view of a portable electronic device 800 including a housing 802 and an audio component assembly 804 disposed within the housing 802. The audio component assembly 804 can include substantially similar features and components having the functionality as other audio component assemblies described herein, for example, any one or more of audio component assemblies 200, 300, 400, 500, 600, 700. For example, an audio component volume 806 can experience a variance in relative pressure (e.g., a pressure within the audio component volume 806 relative to a pressure of an ambient environment 808 outside of the audio component volume 806). For example, a variance in temperature and/or atmospheric pressure can vary the relative pressure within the audio component volume 806. Fluctuations in relative pressure can degrade components of the audio component assembly 804 (e.g., a membrane) or otherwise cause the audio component assembly 804 to perform poorly.

Accordingly, venting the audio component volume 806 can be beneficial to regulate the relative pressure within the audio component volume 806 and thereby prevent damage to the audio component assembly 804. In some examples, a venting element (e.g., venting elements 132, 208, 308, 414, 514, 614, 714) can provide a fluid path (illustrated by arrow 810) which places the audio component volume 806 in fluid communication with an external volume 812 defined by the housing 802. However, other components within the housing 802 can interfere or negatively impact the performance of the audio component assembly 804. For example a speaker 814 disposed within the housing 802 can emit one or more acoustic waves 816 that can propagate through the fluid path 810 and negatively impact performance of the audio component assembly 804.

In some examples, the audio component assembly 804 can include an enclosure 818 having one or more vents 820 that inhibit or prevent the one or more acoustic waves 816 from propagating into the audio component volume 806 but still provide fluid communication between the audio component volume 806 and the external volume 812. In examples, the enclosure 818 can be fluid impermeable except at the vent 820. The vent 820 can enable fluid communication between the audio component volume 806 and the external volume 812 such that a pressure differential between the audio component volume 806 and the ambient environment 808 can be at least partially equalized. The vent 820 can be formed from a material that enables fluid communication but otherwise at least partially attenuates acoustic waves 816. For example, the vent 820 can include a porous material, such as, a metallic or polymer-based open-cell foam that enables fluid through the vent 820. The vent 820 can be affixed to the enclosure 818 using an adhesive, one or more fasteners, molding, co-molding, welding (e.g., sonic welding), or a combination thereof. While the vent 820 is illustrated on a particular sidewall 824B of the enclosure 818, the vent 820 can be positioned on any sidewall (e.g., sidewalls 824A, 824B, 824C) or other surface of the enclosure 818.

The enclosure 818 can be directly coupled to the audio component assembly 804, the housing 802 of the portable electronic device 800, or a combination thereof. For example, the enclosure 818 can be press-fit, fastened, adhered, molded, or otherwise affixed to the audio component assembly 804 as shown in FIG. 8. The enclosure 818 can at least partially form an intermediate volume 822 in fluid communication with both the audio component volume 806 and the external volume 812. The enclosure 818 can include metals, ceramics, polymers, or combinations thereof. For example, the enclosure 818 can be formed from a stamped aluminum sheet or machined aluminum billet. The enclosure 818 can be molded, machined, stamped, cast, or manufactured in any other method.

Figure 9:
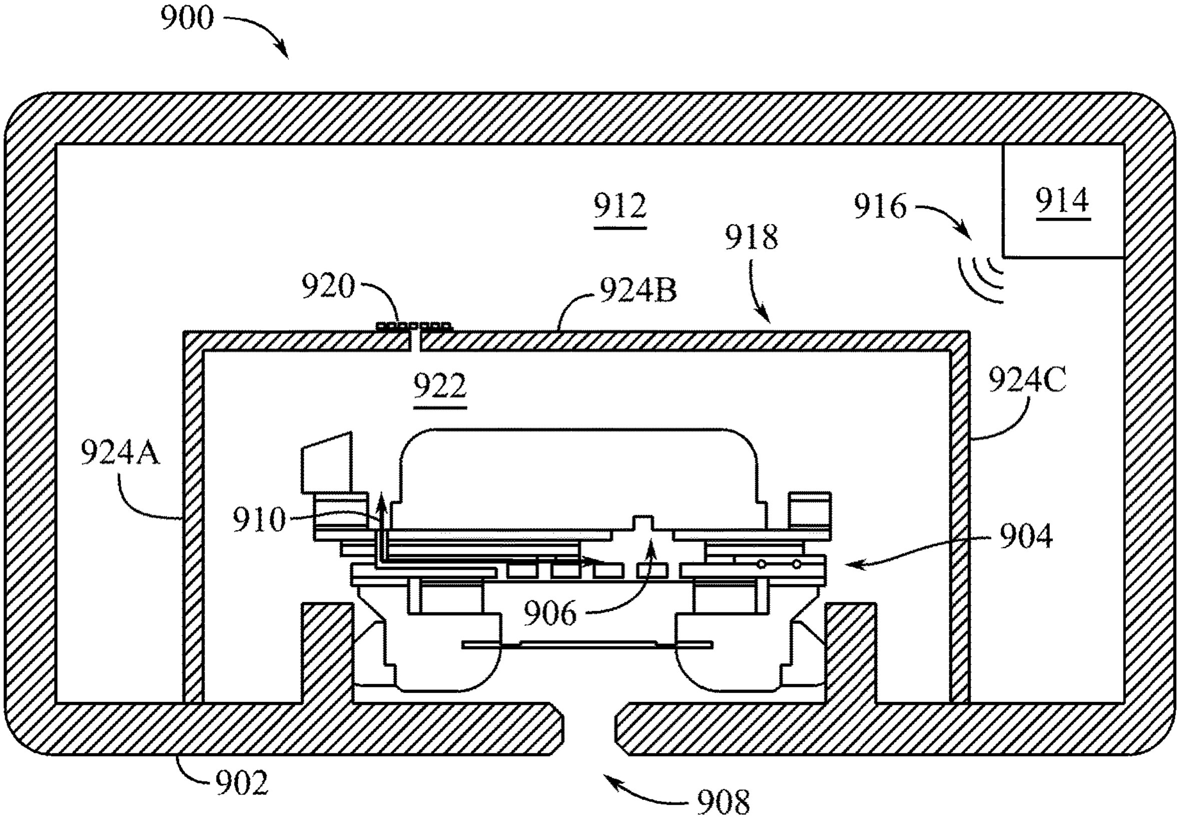
FIG. 9 shows a cross-sectional side view of a portable electronic device.

FIG. 9 shows a cross-sectional view of a portable electronic device 900 including a housing 902 and an audio component assembly 904 disposed within the housing 902. The audio component assembly 904 can include substantially similar features and components having the functionality as other audio component assemblies described herein, for example, any one or more of audio component assemblies 200, 300, 400, 500, 600, 700, 804. The audio component assembly 904 can define or form an audio component assembly volume 906. A pressure within the volume 906 can vary relative to an atmospheric pressure of an ambient environment 908 outside of the housing 902.

In some examples, a venting element (e.g., venting elements 132, 208, 308, 414, 514, 614, 714) can provide a fluid path (illustrated by arrow 910) which places the audio component volume 906 in fluid communication with an external volume 912 defined by the housing 902. However, other components within the housing 902 can interfere or negatively impact the performance of the audio component assembly 904. For example a speaker 914 disposed within the housing 902 can emit one or more acoustic waves 916 that can propagate through the fluid path 910 and negatively impact performance of the audio component assembly 904.

In some examples, the audio component assembly 904 can be substantially surrounded by an enclosure 918 having one or more vents 920 that inhibit or prevent the one or more acoustic waves 916 from propagating into the audio component volume 906 but still provide fluid communication between the audio component volume 906 and the external volume 912. In examples, the enclosure 818 can be fluid impermeable except at the vent 820. The vent 920 can enable fluid communication between the audio component volume 906 and the external volume 912 such that a pressure differential between the audio component volume 906 and the ambient environment 908 can be equalized. The vent 920 can be formed from a material that enables fluid communication but otherwise at least partially attenuates acoustic waves 916. For example, the vent 920 can include a porous material, such as, a metallic or polymer-based open-cell foam that enables fluid through the vent 920. The vent 920 can be affixed to the enclosure 918 using an adhesive, one or more fasteners, molding, co-molding, welding (e.g., sonic welding), or a combination thereof. While the vent 920 is illustrated on a particular sidewall 924B of the enclosure 918, one or more vents 920 can be positioned on one or more sidewalls (e.g., sidewalls 924A, 924B, 924C) or any other surface of the enclosure 918.

The enclosure 918 can be directly coupled to the audio component assembly 904, the housing 902 of the portable electronic device 900, or a combination thereof. For example, the enclosure 918 can be fastened, adhered, molded, or otherwise affixed to the housing 902. The enclosure 918 can at least partially form an intermediate volume 922 in fluid communication with both the audio component volume 906 and the external volume 912. The enclosure 918 can include metals, ceramics, polymers, or combinations thereof. For example, the enclosure 918 can be formed from a stamped aluminum sheet or machined aluminum billet. The enclosure 918 can be molded, machined, stamped, cast, or manufactured in any other method.

Figure 10:
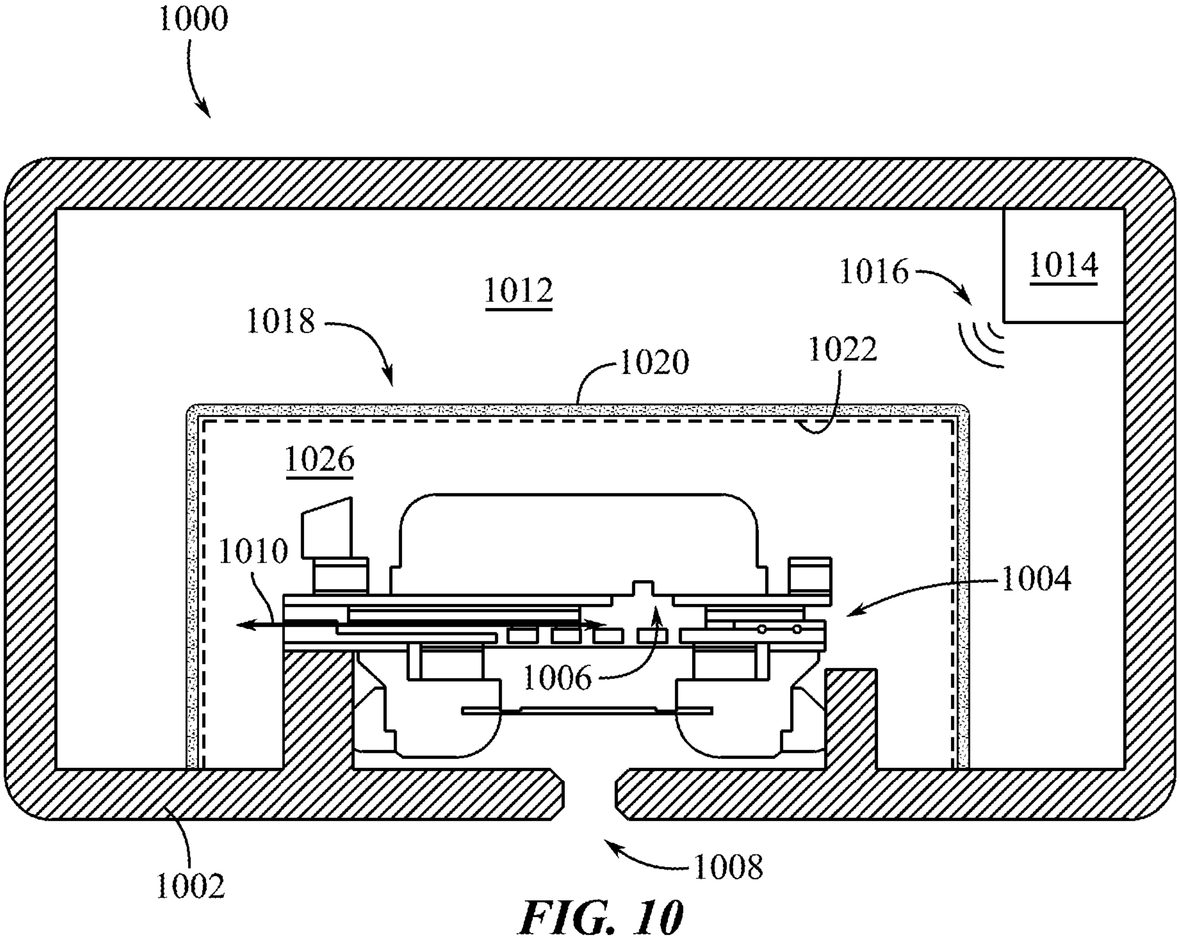
FIG. 10 shows a cross-sectional side view of a portable electronic device.

FIG. 10 shows a cross-sectional view of a portable electronic device 1000 including a housing 1002 and an audio component assembly 1004 disposed within the housing 1002. The audio component assembly 1004 can include substantially similar features and components having the functionality as other audio component assemblies described herein, for example, any one or more of audio component assemblies 200, 300, 400, 500, 600, 700, 804, 904. The audio component assembly 1004 can define or form an audio component assembly volume 1006. A pressure within the volume 1006 can vary relative to an atmospheric pressure of an ambient environment 1008 outside of the housing 1002.

In some examples, a venting element (e.g., venting elements 132, 208, 308, 414, 514, 614, 714) can provide a fluid path (illustrated by arrow 1010) which places the audio component volume 1006 in fluid communication with an external volume 1012 defined by the housing 1002. However, other components within the housing 1002 can interfere or negatively impact the performance of the audio component assembly 1004. For example a speaker 1014 disposed within the housing 1002 can emit one or more acoustic waves 1016 that can propagate through the fluid path 1010 and negatively impact performance of the audio component assembly 1004.

In some examples, the audio component assembly 1004 can be substantially surrounded by an enclosure 1018 that inhibits or limits the one or more acoustic waves 1016 from propagating into the audio component volume 1006 but still provide fluid communication between the audio component volume 1006 and the external volume 1012. In examples, the enclosure 1018 can be fluid permeable to enable fluid communication between the audio component volume 1006 and the external volume 1012 such that a pressure differential between the audio component volume 1006 and the ambient environment 1008 can be equalized. The enclosure 1018 can be formed from one or more materials that enable fluid communication but otherwise at least partially attenuates acoustic waves 1016. For example, the enclosure 1018 can include a fluid permeable layer 1020, such as, a metallic or polymer-based open-cell foam that enables fluid flow through the enclosure 1018 while reducing or impeding acoustic waves from propagating into the audio component volume 1006. The fluid permeable layer 1020 can be affixed to a support structure 1022 positioned around the audio component assembly 1004.

In examples, the support structure 1022 can be a rigid structure that supports the fluid permeable layer 1020 in a fixed position relative to the audio component assembly 1004. For example, the support structure 1022 can be stamped, machined, cast, or molded from a semi-rigid materials, such as, a polymer, a ceramic, a metal, or a combination thereof.

The enclosure 1018 can be directly coupled to the audio component assembly 1004, the housing 1002 of the portable electronic device 1000, or a combination thereof. For example, the enclosure 1018 can be fastened, adhered, molded, or otherwise affixed to the housing 1002. The enclosure 1018 can at least partially form an intermediate volume 1026 in fluid communication with both the audio component volume 1006 and the external volume 1012.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not target to be exhaustive or to limit the examples to the precise forms disclosed. It will be apparent to one of ordinary skill in the art that many modifications and variations are possible in view of the above teachings.

What is claimed is:

1. An electronic device, comprising:

a housing at least partially defining a first internal volume; and an audio component defining a second internal volume, the audio component comprising:

a membrane; and a venting element defining a fluid path, the fluid path extends from the first internal volume to the second internal volume, the venting element comprising:

a first layer at least partially defining a first channel;

a second layer at least partially defining a second channel; and a fluid permeable intermediate layer disposed between the first layer and the second layer.

2. The electronic device of claim 1, wherein:

the first channel extends from a central portion of the venting element; and the second channel extends from a periphery of the venting element.

3. The electronic device of claim 2, wherein:

a length of the first channel is greater than half of a distance between the central portion and the periphery; and a length of the second channel is greater than half of the distance.

4. The electronic device of claim 1, wherein the fluid permeable intermediate layer comprises a region disposed between the first and second channels, the region placing the first and second channels in fluid communication.

5. The electronic device of claim 1, wherein the audio component comprises a microphone.

6. The electronic device of claim 2, wherein:

a width of the first channel narrows as the first channel extends from the central portion; and a width of the second channel narrows as the second channel extends from the periphery.

7. The electronic device of claim 1, wherein the fluid permeable intermediate layer further comprises a porous metal.

8. The electronic device of claim 1, further comprising an enclosure disposed within the housing and at least partially surrounding the audio component, the enclosure defining a third internal volume, the fluid path placing the first internal volume, the second internal volume, and the third internal volume in fluid communication.

9. An audio component, comprising:

a case at least partially defining an internal volume;

a membrane at least partially defining the internal volume; and a venting element in fluid communication with the internal volume, the venting element defining a fluid path extending from the internal volume to an environment external to the case, the venting element comprising:

a first fluid impermeable layer;

a second fluid impermeable layer; and a porous layer disposed between the first fluid impermeable layer and the second fluid impermeable layer, the porous layer defining at least a portion of the fluid path.

10. The audio component of claim 9, wherein the fluid path extends from a central portion of the venting element to a periphery of the venting element.

11. The audio component of claim 9, wherein the venting element comprises:

a first layer at least partially defining a first channel;

a second layer at least partially defining a second channel; and a fluid permeable intermediate layer disposed between the first layer and the second layer.

12. The audio component of claim 11, wherein:

the first channel and the second channel extend parallel to the fluid permeable intermediate layer;

a width of the first channel varies along a length of the first channel;

a width of the second channel varies along a length of the second channel; and a region of the fluid permeable intermediate layer is disposed between the first channel and the second channel.

13. The audio component of claim 9, wherein the porous layer comprises a metal foam.

14. The audio component of claim 9, wherein the venting element further comprises a coiled member coupled to the fluid impermeable layer, at least a portion of the fluid path being defined by the fluid impermeable layer and the coiled member.

15. The audio component of claim 9, wherein the venting element further comprises:

a fluid impermeable layer; and a coiled member coupled to the fluid impermeable layer, the coiled member defining a conduit, and at least a portion of the fluid path being formed by the conduit.

16. The audio component of claim 9, wherein the audio component comprises at least one of a speaker or a microphone.

17. A venting element for a portable electronic device, comprising:

a first fluid impermeable layer defining a first surface of the venting element;

a second fluid impermeable layer defining a second surface of the venting element; and a coiled member disposed between the first fluid impermeable layer and the second fluid impermeable layer, the coiled member defining a conduit defining a fluid path extending to an external environment.

18. The venting element of claim 17, wherein the conduit extends from a central portion of the venting element toward a periphery of the venting element.

19. The venting element of claim 17, wherein the fluid impermeable layer comprises a polymer.

* * * * *